United States Patent
Zhang et al.

(10) Patent No.: US 12,309,803 B2
(45) Date of Patent: May 20, 2025

(54) CONFIGURATION INFORMATION OBTAINING METHOD AND APPARATUS

(71) Applicant: HUAWEI TECHNOLOGIES CO., LTD., Guangdong (CN)

(72) Inventors: Yunhao Zhang, Shanghai (CN); Zhe Luo, Shanghai (CN); Xiuqiang Xu, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 17/874,006

(22) Filed: Jul. 26, 2022

(65) Prior Publication Data

US 2022/0369300 A1    Nov. 17, 2022

Related U.S. Application Data

(63) Continuation of application No. PCT/CN2021/076212, filed on Feb. 9, 2021.

(30) Foreign Application Priority Data

Feb. 14, 2020  (CN) .......................... 202010093115.5

(51) Int. Cl.
*H04W 72/23*      (2023.01)
*H04W 56/00*      (2009.01)
(Continued)

(52) U.S. Cl.
CPC ......... *H04W 72/23* (2023.01); *H04W 56/001* (2013.01); *H04W 72/0446* (2013.01);
(Continued)

(58) Field of Classification Search
CPC ............... H04W 72/23; H04W 56/001; H04W 72/0446; H04W 72/0453; H04W 76/20;
(Continued)

(56) References Cited

U.S. PATENT DOCUMENTS

2016/0309453 A1*   10/2016   Quan ..................... H04W 72/23
2018/0220486 A1*   8/2018    Tseng ................... H04W 36/305
(Continued)

FOREIGN PATENT DOCUMENTS

CN    108271227 A    7/2018
CN    109121181 A    1/2019
(Continued)

OTHER PUBLICATIONS

3GPP TS 38.321 V15.8.0:"3rd Generation Partnership Project;Technical Specification Group Radio Access Network; NR;Medium Access Control (MAC) protocol specification(Release 15)",Dec. 2019,total 78 pages.
(Continued)

*Primary Examiner* — Obaidul Huq

(57) ABSTRACT

Embodiments of this application provide a configuration information obtaining method and an apparatus, which may be applied to a scenario in which a terminal device obtains an RNTI. The terminal device may be in RRC inactive mode. The method may include: obtaining a cell identifier, and obtaining first configuration information based on the cell identifier, where there is a correspondence between the cell identifier and the first configuration information, and the first configuration information is used to configure an RNTI; and performing one or more of the following operations based on the first configuration information: receiving downlink control information, receiving downlink data, sending uplink control information, or sending uplink data.

15 Claims, 9 Drawing Sheets

(51) Int. Cl.
   *H04W 72/0446* (2023.01)
   *H04W 72/0453* (2023.01)
   *H04W 76/20* (2018.01)
   *H04W 76/30* (2018.01)

(52) U.S. Cl.
   CPC ....... *H04W 72/0453* (2013.01); *H04W 76/20* (2018.02); *H04W 76/30* (2018.02)

(58) Field of Classification Search
   CPC ....... H04W 76/30; H04W 8/26; H04W 48/16; H04W 52/0216; H04W 52/0219; H04W 52/028; H04W 52/0229; H04W 76/27; H04W 24/02; H04W 52/0261; H04W 68/00; H04W 72/21; H04L 5/001; H04L 5/0044; H04L 5/0053; H04L 5/0094; Y02D 30/70
   USPC ......................................... 370/310, 328, 329
   See application file for complete search history.

(56) References Cited

U.S. PATENT DOCUMENTS

2020/0053791 A1   2/2020   Ozturk et al.
   2020/0221310 A1*  7/2020   Babaei .................. H04L 1/1671
   2022/0225420 A1*  7/2022   Dong .................. H04W 74/002

FOREIGN PATENT DOCUMENTS

| CN | 109150480 A | 1/2019 |
| CN | 110535557 A | 12/2019 |
| EP | 3570508 A1 | 11/2019 |
| WO | 2017190353 A1 | 11/2017 |
| WO | 2019041099 A1 | 3/2019 |
| WO | 2019103552 A1 | 5/2019 |

OTHER PUBLICATIONS

3GPP TS 38.331 V15.8.0 (Dec. 2019), 3rd Generation Partnership Project;Technical Specification Group Radio Access Network;NR-;Radio Resource Control (RRC) protocol specification(Release 15), total 532 pages.

3GPP TS 38.300,V16.0.0 :"3rd Generation Partnership Project Technical Specification Group Radio Access Network; NR; NR and NG-RAN Overall Description; Stage 2 (Release 16)",Jan. 8, 2020, pp. 1-101, XP051860596.

Qualcomm Incorporated: UE AS Context for RRC_Inactive, 3GPP Draft; R2-1805090 Apr. 14, 2018, XP051428772, total 4 pages.

Huawei et al: "RAN initiated Paging", 3GPP Draft; R2-1803638,Feb. 16, 2018 XP051400661,total 3 pages.

3rd Generation Partnership Project;Technical Specification Group Radio Access Network;NR;Physical layer procedures for control(Release 15) 3GPP TS 38.213 V15.8.0 (Dec. 2019) total:109 pages.

* cited by examiner

CONFIGURATION INFORMATION OBTAINING METHOD AND APPARATUS

CROSS-REFERENCE TO RELATED APPLICATIONS

This application is a continuation of International Application No. PCT/CN2021/076212, filed on Feb. 9, 2021, which claims priority to Chinese Patent Application No. 202010093115.5, filed on Feb. 14, 2020. The disclosures of the aforementioned applications are hereby incorporated by reference in their entireties.

TECHNICAL FIELD

Embodiments of this application relate to the field of communication technologies, and specifically, to a configuration information obtaining method and an apparatus.

BACKGROUND

Downlink control information (DCI) may be used to schedule transmission of a downlink data channel, for example, schedule transmission of a physical downlink shared channel (PDSCH), or may schedule transmission of an uplink data channel, for example, schedule transmission of a physical uplink shared channel (PUSCH). The DCI used to schedule the transmission of the PDSCH/PUSCH is transmitted through a physical downlink control channel (PDCCH). The PDCCH is carried on a time-frequency resource jointly determined based on both configuration information of a control resource set (CORESET) and configuration information of a SearchSpace. The time-frequency resource jointly determined based on both the configuration information of the CORESET and the configuration information of the SearchSpace may be referred to as a time-frequency resource for the DCI, and a terminal device may monitor the DCI on the time-frequency resource.

A cyclic redundancy check (CRC) of the DCI is scrambled by using a radio network temporary identifier (RNTI). In different scenarios, the RNTI may be shared or dedicated to the terminal device, may be specifically predefined, or may be configured by a network device for the terminal device. The terminal device attempts to descramble the CRC of the DCI by using the RNTI. If descrambling succeeds, the terminal device may receive and obtain content of the DCI.

The terminal device may establish a radio resource control (RRC) connection to the network device. When the RRC connection is established, an RRC status of the terminal device is RRC connected mode. In addition to RRC connected mode, the RRC status of the terminal device may be RRC idle mode or RRC inactive mode. Currently, the terminal device in RRC inactive mode cannot obtain a corresponding RNTI configuration when entering RRC inactive mode, and cannot perform data transmission with the network device. To implement data transmission between the terminal device in RRC inactive mode and the network device, the terminal device needs to obtain an RNTI used in RRC inactive mode.

Therefore, how the terminal device obtains the RNTI used by the terminal device in RRC inactive mode is an urgent technical problem to be resolved.

SUMMARY

Embodiments of this application provide a configuration information obtaining method and an apparatus, so that a terminal device can obtain an RNTI used by the terminal device in RRC inactive mode, and the terminal device can transmit data at low power consumption.

A first aspect of embodiments of this application provides a configuration information obtaining method. The method may be performed by a terminal device, or may be performed by a component (for example, a processor, a chip, or a chip system) of the terminal device. The method includes: obtaining a cell identifier; obtaining first configuration information based on the cell identifier, where there is a correspondence between the cell identifier and the first configuration information, and the cell identifier is an identifier of a cell in a radio access network-based notification area RNA; and performing one or more of the following operations based on the first configuration information:

receiving downlink control information DCI, receiving downlink data, sending uplink control information, or sending uplink data.

In a possible implementation, the first configuration information is used to configure an RNTI.

According to the first aspect of embodiments of this application, the first configuration information used to configure the RNTI is obtained by using the cell identifier, so that the terminal device can transmit data to a network device based on the RNTI.

The cell identifier may be used to identify a cell on which the terminal device camps, for example, may be used to identify a cell on which the terminal device camps when the terminal device is in RRC inactive mode. The terminal device in RRC inactive mode performs the method provided in the first aspect, so that the terminal device can obtain an RNTI used by the terminal device in RRC inactive mode, thereby implementing data transmission between the terminal device in RRC inactive mode and the network device. The terminal device transmits data in RRC inactive mode, so that the terminal device transmits data at low power consumption, thereby slowing down a power consumption speed of the terminal device and prolonging use duration of the terminal device. Compared with data transmission performed by the terminal device in RRC connected mode, data transmission requires fewer signaling overheads, so that network resources are saved.

In a possible implementation, the terminal device receives second configuration information, where the second configuration information is used to configure the correspondence between the cell identifier and the first configuration information. The terminal device may receive the second configuration information when the terminal device is in RRC connected mode, and may obtain the first configuration information based on the second configuration information and the obtained cell identifier when the terminal device is in RRC inactive mode, so that the terminal device in RRC inactive mode can transmit data at low power consumption.

The correspondence between the cell identifier and the first configuration information may also be predefined, so that the terminal device can directly obtain the first configuration information when obtaining the cell identifier, and can quickly enter a scenario in which data is transmitted at low power consumption.

In a possible implementation, that there is a correspondence between the cell identifier and the first configuration information may be: there is a correspondence between the cell identifier and an RNTI. The terminal device obtains the RNTI based on the obtained cell identifier, to perform one or more of the following operations based on the RNTI: receiving downlink control information, receiving downlink data, sending uplink control information, and sending uplink data, so that the terminal device can transmit data at low power consumption.

In a possible implementation, the first configuration information is used to configure a time-frequency resource for the downlink control information, so that the terminal device can quickly detect the downlink control information.

In a possible implementation, the time-frequency resource for the downlink control information is determined based on configuration information of a control resource set and configuration information of a search space.

In a possible implementation, that there is a correspondence between the cell identifier and the first configuration information may be: there is a correspondence between the cell identifier and an RNTI and the time-frequency resource for the downlink control information. The terminal device obtains the RNTI and the time-frequency resource for the downlink control information based on the obtained cell identifier, so that the terminal device can quickly obtain the downlink control information. Further, the downlink control information may be used to schedule transmission of a PDSCH, and the terminal device may receive, based on the received downlink control information, downlink data carried on the PDSCH, so that the terminal device can receive the downlink data at low power consumption.

In a possible implementation, that there is a correspondence between the cell identifier and the first configuration information may be: there is a correspondence between the cell identifier and an RNTI and the time-frequency resource for the downlink control information. In addition to obtaining the cell identifier, the terminal device further obtains a synchronization signal block index. There is a correspondence between the synchronization signal block index and the time-frequency resource for the downlink control information. The terminal device obtains the RNTI based on the obtained cell identifier, and obtains the time-frequency resource for the downlink control information based on the cell identifier and the synchronization signal block index that are obtained, so that the terminal device can quickly obtain an accurate time-frequency resource for the downlink control information.

The terminal device may obtain the cell identifier by using a detected synchronization signal block, so that an accurate cell identifier can be obtained. The terminal device may obtain the synchronization signal block index by using the detected synchronization signal block, so that an accurate synchronization signal block index can be obtained.

In a possible implementation, that there is a correspondence between the cell identifier and the first configuration information may be: there is a correspondence between the cell identifier and an RNTI and an uplink configured-grant resource. The terminal device obtains the RNTI and the uplink configured-grant resource based on the obtained cell identifier, to send uplink control information and/or uplink data based on the RNTI and the uplink configured-grant resource, so that the terminal device can perform uplink transmission at low power consumption.

In a possible implementation, the first configuration information is invalid when a timer corresponding to the first configuration information expires; otherwise, the first configuration information is valid when the timer corresponding to the first configuration information does not expire.

In a possible implementation, the first configuration information is invalid when the terminal device is in RRC connected mode; or the first configuration information is valid when the terminal device is in RRC inactive mode.

In a possible implementation, the first configuration information is invalid when the terminal device fails to transmit data by using the RNTI configured by using the first configuration information; otherwise, the first configuration information is valid.

In the foregoing three manners, if the first configuration information is invalid, the terminal device cannot still use the first configuration information. For example, the terminal device cannot perform one or more of the following operations based on the first configuration information: receiving downlink control information, receiving downlink data, sending uplink control information, or sending uplink data. In this way, the terminal device can be prevented from performing invalid data transmission. When the first configuration information is invalid, the terminal device may release, in a timely manner, the RNTI and the time-frequency resource that are configured by using the first configuration information, so that network resources can be saved.

A second aspect of embodiments of this application provides a communication apparatus. The communication apparatus may be a terminal device, a component in the terminal device, or an apparatus that can be used together with the terminal device. The terminal device may be in RRC inactive mode. In a design, the apparatus may include modules corresponding to the methods/operations/steps/actions described in the first aspect. The modules may be implemented by using a hardware circuit, software, or a combination of the hardware circuit and the software. In a design, the apparatus may include a processing module and a transceiver module.

For example, the processing module is configured to: obtain a cell identifier; and obtain first configuration information based on the cell identifier, where there is a correspondence between the cell identifier and the first configuration information, and the cell identifier is an identifier of a cell in a radio access network-based notification area RNA.

The processing module is further configured to control, based on the first configuration information, the transceiver module to perform one or more of the following operations:
  receiving downlink control information, receiving downlink data, sending uplink control information, or sending uplink data.

In a possible implementation, the first configuration information is used to configure an RNTI.

In a possible implementation, the transceiver module is further configured to receive second configuration information, where the second configuration information is used to configure the correspondence between the cell identifier and the first configuration information.

In a possible implementation, that there is a correspondence between the cell identifier and the first configuration information is specifically: there is a correspondence between the cell identifier and a radio network temporary identifier.

The processing module is specifically configured to obtain the radio network temporary identifier based on the cell identifier.

In a possible implementation, the first configuration information is used to configure a time-frequency resource for the downlink control information.

In a possible implementation, the time-frequency resource for the downlink control information is determined based on configuration information of a control resource set and configuration information of a search space.

In a possible implementation, that there is a correspondence between the cell identifier and the first configuration information is specifically: there is a correspondence between the cell identifier and a radio network temporary identifier and the time-frequency resource for the downlink control information.

The processing module is specifically configured to obtain the radio network temporary identifier and the time-frequency resource for the downlink control information based on the cell identifier.

In a possible implementation, that there is a correspondence between the cell identifier and the first configuration information is specifically: there is a correspondence between the cell identifier and a radio network temporary identifier and the time-frequency resource for the downlink control information.

The processing module is further configured to obtain a synchronization signal block index, where there is a correspondence between the synchronization signal block index and the time-frequency resource for the downlink control information.

The processing module is specifically configured to: obtain the radio network temporary identifier based on the cell identifier; and obtain the time-frequency resource for the downlink control information based on the cell identifier and the synchronization signal block index.

In a possible implementation, the first configuration information is invalid when a timer corresponding to the first configuration information expires.

In a possible implementation, the first configuration information is invalid when a terminal device is in radio resource control connected mode.

In a possible implementation, the first configuration information is invalid when data fails to be transmitted by using the radio network temporary identifier.

A third aspect of embodiments of this application provides a communication apparatus. The apparatus includes a processor, configured to implement the method described in the first aspect. The apparatus may further include a memory, configured to store instructions and data. The memory is coupled to the processor. When the processor executes the instructions stored in the memory, the apparatus may be enabled to implement the method described in the first aspect. The apparatus may further include a communication interface. The communication interface is used by the apparatus to communicate with another device. For example, the communication interface may be a transceiver, a circuit, a bus, a module, or another type of communication interface. The another device may be a network device or the like. In a possible design, the apparatus includes:

a memory, configured to store program instructions; and
a processor, configured to: obtain a cell identifier; obtain first configuration information based on the cell identifier, where there is a correspondence between the cell identifier and the first configuration information, and the cell identifier is an identifier of a cell in a radio access network-based notification area RNA; and control, based on the first configuration information, the communication interface to perform one or more of the following operations:
receiving downlink control information, receiving downlink data, sending uplink control information, or sending uplink data.

In a possible implementation, the first configuration information is used to configure an RNTI.

In a possible implementation, the processor controls the communication interface to further receive second configuration information, where the second configuration information is used to configure the correspondence between the cell identifier and the first configuration information.

In a possible implementation, that there is a correspondence between the cell identifier and the first configuration information is specifically: there is a correspondence between the cell identifier and the radio network temporary identifier.

The processor is specifically configured to obtain the radio network temporary identifier based on the cell identifier.

In a possible implementation, the first configuration information is used to configure a time-frequency resource for the downlink control information.

In a possible implementation, the time-frequency resource for the downlink control information is determined based on configuration information of a control resource set and configuration information of a search space.

In a possible implementation, that there is a correspondence between the cell identifier and the first configuration information is specifically: there is a correspondence between the cell identifier and a radio network temporary identifier and the time-frequency resource for the downlink control information.

The processor is specifically configured to obtain the radio network temporary identifier and the time-frequency resource for the downlink control information based on the cell identifier.

In a possible implementation, that there is a correspondence between the cell identifier and the first configuration information is specifically: there is a correspondence between the cell identifier and a radio network temporary identifier and the time-frequency resource for the downlink control information.

The processor is further configured to obtain a synchronization signal block index, where there is a correspondence between the synchronization signal block index and the time-frequency resource for the downlink control information.

The processor is specifically configured to: obtain the radio network temporary identifier based on the cell identifier; and obtain the time-frequency resource for the downlink control information based on the cell identifier and the synchronization signal block index.

In a possible implementation, the first configuration information is invalid when a timer corresponding to the first configuration information expires.

In a possible implementation, the first configuration information is invalid when a terminal device is in radio resource control connected mode.

In a possible implementation, the first configuration information is invalid when data fails to be transmitted by using the radio network temporary identifier.

A fourth aspect of embodiments of this application provides a computer-readable storage medium, including instructions. When the instructions are run on a computer, the computer is enabled to perform the method provided in the first aspect.

A fifth aspect of embodiments of this application provides a chip system. The chip system includes a processor, and may further include a memory, configured to implement the method provided in the first aspect. The chip system may include a chip, or may include a chip and another discrete component.

A sixth aspect of embodiments of this application provides a configuration information obtaining method. The method may be performed by a first network device, or may be performed by a component (for example, a processor, a chip, or a chip system) of the first network device. The method includes:

The first network device sends identification information of a terminal device, where the identification information of the terminal device is used to request third configuration information corresponding to the terminal device.

The first network device receives the third configuration information, where there is a correspondence between the third configuration information and a cell identifier of a second cell, and the cell identifier is an identifier of a cell in a radio access network-based notification area RNA.

In a possible implementation, the third configuration information is used to configure an RNTI.

The first network device may be a network device that establishes an RRC connection to the terminal device before the terminal device switches to RRC inactive mode. The first network device may send the identification information of the terminal device to a second network device, and the first network device may receive the third configuration information from the second network device. The second network device may be a network device in the notification area configured for the terminal device. There may be one or more second network devices, and a coverage area of the second network device includes one or more second cells. When the terminal device is in RRC inactive mode, the terminal device may move in the notification area.

According to the sixth aspect of embodiments of this application, the first network device notifies the second network device of the identification information of the terminal device, so that the second network device allocates the third configuration information to the terminal device, the second network device may allocate different RNTIs to different terminal devices, and the terminal device can obtain a dedicated RNTI used by the terminal device in RRC inactive mode.

In a possible implementation, the first network device sends fourth configuration information to the terminal device. The fourth configuration information is used to configure a correspondence between the cell identifier of the second cell and the third configuration information, so that the terminal device can obtain the third configuration information based on the obtained cell identifier, and the terminal device can transmit data at low power consumption.

In a possible implementation, that there is a correspondence between the third configuration information and a cell identifier of a second cell may be: there is a correspondence between the RNTI and the cell identifier of the second cell. In this case, the terminal device can obtain, based on the obtained cell identifier of the second cell, an RNTI corresponding to the cell identifier, and the terminal device can obtain an RNTI used by the terminal device in RRC inactive mode, and transmit data by using the RNTI at low power consumption.

In a possible implementation, the third configuration information is used to configure a time-frequency resource for downlink control information, so that the terminal device can quickly detect the downlink control information.

In a possible implementation, the time-frequency resource for the downlink control information is determined based on configuration information of a control resource set and configuration information of a search space.

In a possible implementation, that there is a correspondence between the third configuration information and a cell identifier of a second cell may be: there is a correspondence between the RNTI and the time-frequency resource for the downlink control information and the cell identifier of the second cell. In this case, the terminal device can quickly obtain the downlink control information based on the obtained cell identifier of the second cell.

In a possible implementation, there is a correspondence between the time-frequency resource for the downlink control information and a synchronization signal block index. In this case, the terminal device can obtain, based on the obtained cell identifier of the second cell, the RNTI corresponding to the cell identifier, and obtain the time-frequency resource for the downlink control information based on the obtained cell identifier and the synchronization signal block index, and the terminal device can quickly obtain an accurate time-frequency resource for the downlink control information.

In a possible implementation, the first network device receives fifth configuration information, where the fifth configuration information is used to configure a timer corresponding to the third configuration information, so that the first network device may determine whether the third configuration information is valid. The fourth configuration information sent by the first network device to the terminal device may be further used to configure the timer corresponding to the third configuration information, so that the terminal device can determine whether the first configuration information is valid, thereby preventing the terminal device from performing invalid data transmission. The fifth configuration information may be from the second network device. The fifth configuration information and the third configuration information may be sent together or separately.

In a possible implementation, the third configuration information is invalid when a timer corresponding to the third configuration information expires; otherwise, the third configuration information is valid when the timer corresponding to the third configuration information does not expire.

In a possible implementation, the third configuration information is invalid when the terminal device is in RRC connected mode; or the third configuration information is valid when the terminal device is not in RRC connected mode.

In a possible implementation, the third configuration information is invalid when the terminal device is not in the notification area.

A seventh aspect of embodiments of this application provides a communication apparatus. The communication apparatus may be a first network device, a component in the first network device, or an apparatus that can be used together with the first network device. In a design, the apparatus may include modules corresponding to the methods/operations/steps/actions described in the sixth aspect. The modules may be implemented by using a hardware circuit, software, or a combination of the hardware circuit and the software. In a design, the apparatus may include a transceiver module, and the transceiver module may include a sending module and a receiving module.

For example, the sending module is configured to send identification information of a terminal device, where the identification information of the terminal device is used to request third configuration information corresponding to the terminal device; and the receiving module is configured to receive the third configuration information, where there is a correspondence between the third configuration information and a cell identifier of a second cell, and the cell identifier is an identifier of a cell in a radio access network-based notification area RNA.

An eighth aspect of embodiments of this application provides a communication apparatus. The apparatus includes a processor, configured to implement the method described in the sixth aspect. The apparatus may further include a memory, configured to store instructions and data. The memory is coupled to the processor. When the processor executes the instructions stored in the memory, the apparatus may be enabled to implement the method described in the sixth aspect. The apparatus may further include a communication interface. The communication interface is used by the apparatus to communicate with another device. For example, the communication interface may be a transceiver, a circuit, a bus, a module, or another type of communication interface. The another device may be a terminal device, a second network device, or the like. In a possible design, the apparatus includes:

a memory, configured to store program instructions; and a processor, configured to: control the communication interface to send identification information of a terminal device, where the identification information of the terminal device is used to request third configuration information corresponding to the terminal device; and control the communication interface to receive the third configuration information, where there is a correspondence between the third configuration information and a cell identifier of a second cell, and the cell identifier is an identifier of a cell in a radio access network-based notification area RNA.

A ninth aspect of embodiments of this application provides a computer-readable storage medium, including instructions. When the instructions are run on a computer, the computer is enabled to perform the method provided in the sixth aspect.

A tenth aspect of embodiments of this application provides a chip system. The chip system includes a processor, and may further include a memory, configured to implement the method provided in the sixth aspect. The chip system may include a chip, or may include a chip and another discrete component.

An eleventh aspect of embodiments of this application provides a configuration information obtaining method. The method may be performed by a second network device, or may be performed by a component (for example, a processor, a chip, or a chip system) of the second network device. The method includes:

The second network device receives identification information of a terminal device.

The second network device sends third configuration information based on the identification information of the terminal device, where the third configuration information is used to configure an RNTI, and there is a correspondence between the third configuration information and a cell identifier of a second cell.

The second network device may be a network device in a notification area configured for the terminal device. There may be one or more second network devices, and a coverage area of the second network device includes one or more second cells. When the terminal device is in RRC inactive mode, the terminal device may move in the notification area. The second network device may receive the identification information of the terminal device from the first network device, and may send the third configuration information to the first network device. The first network device may be a network device that establishes an RRC connection to the terminal device before the terminal device switches to RRC inactive mode.

In a possible implementation, the third configuration information is used to configure the RNTI.

According to the eleventh aspect of embodiments of this application, the second network device sends the third configuration information to the first network device based on the identification information of the terminal device, so that the second network device can allocate different RNTIs to different terminal devices, and the terminal device can obtain a dedicated RNTI used by the terminal device in RRC inactive mode. In this case, the terminal device can transmit data to the second network device at low power consumption, and signaling overheads of the second network device can be reduced.

In a possible implementation, that there is a correspondence between the third configuration information and a cell identifier of a second cell may be: there is a correspondence between the RNTI and the cell identifier of the second cell. In this case, the terminal device can obtain, based on the obtained cell identifier of the second cell, an RNTI corresponding to the cell identifier, and the terminal device can obtain an RNTI used by the terminal device in RRC inactive mode, and transmit data by using the RNTI at low power consumption.

In a possible implementation, the third configuration information is used to configure a time-frequency resource for the downlink control information, so that the terminal device can quickly detect the downlink control information.

In a possible implementation, the time-frequency resource for the downlink control information is determined based on configuration information of a control resource set and configuration information of a search space.

In a possible implementation, that there is a correspondence between the third configuration information and a cell identifier of a second cell may be: there is a correspondence between the RNTI and the time-frequency resource for the downlink control information and the cell identifier of the second cell. In this case, the terminal device can quickly obtain the downlink control information based on the obtained cell identifier of the second cell.

In a possible implementation, there is a correspondence between the time-frequency resource for the downlink control information and a synchronization signal block index. In this case, the terminal device can obtain, based on the obtained cell identifier of the second cell, the RNTI corresponding to the cell identifier, and obtain the time-frequency resource for the downlink control information based on the obtained cell identifier and the synchronization signal block index, and the terminal device can quickly obtain an accurate time-frequency resource for the downlink control information.

In a possible implementation, the second network device sends fifth configuration information to the first network device, where the fifth configuration information is used to configure a timer corresponding to the third configuration information, so that the first network device may determine whether the third configuration information is valid. The fifth configuration information and the third configuration information may be sent together or separately.

In a possible implementation, the third configuration information is invalid when a timer corresponding to the third configuration information expires; otherwise, the third configuration information is valid when the timer corresponding to the third configuration information does not expire.

In a possible implementation, the third configuration information is invalid when the terminal device is in RRC connected mode; or the third configuration information is valid when the terminal device is not in RRC connected mode.

In a possible implementation, the third configuration information is invalid when the terminal device is not in the notification area.

When the third configuration information is invalid, the second network device does not continue to perform data transmission with the terminal device, so that the second network device can be prevented from performing invalid data transmission. When the third configuration information is invalid, the second network device may release, in a timely manner, the RNTI and the time-frequency resource that are configured by using the third configuration information, so that network resources can be saved.

A twelfth aspect of embodiments of this application provides a communication apparatus. The communication apparatus may be a second network device, a component of the second network device, or an apparatus that can be used together with the second network device. In a design, the apparatus may include modules corresponding to the methods/operations/steps/actions described in the eleventh aspect. The modules may be implemented by using a hardware circuit, software, or a combination of the hardware circuit and the software. In a design, the apparatus may include a transceiver module, and the transceiver module may include a sending module and a receiving module.

For example, the receiving module is configured to receive identification information of a terminal device; and
the sending module is configured to send third configuration information based on the identification information of the terminal device, where there is a correspondence between the third configuration information and a cell identifier of a second cell, and the cell identifier is an identifier of a cell in a radio access network-based notification area RNA.

A thirteenth aspect of embodiments of this application provides a communication apparatus. The apparatus includes a processor, configured to implement the method described in the eleventh aspect. The apparatus may further include a memory, configured to store instructions and data. The memory is coupled to the processor. When the processor executes the instructions stored in the memory, the apparatus may be enabled to implement the method described in the eleventh aspect. The apparatus may further include a communication interface. The communication interface is used by the apparatus to communicate with another device. For example, the communication interface may be a transceiver, a circuit, a bus, a module, or another type of communication interface. The another device may be a first network device or the like. In a possible design, the apparatus includes:
a memory, configured to store program instructions; and
a processor, configured to: control the communication interface to receive identification information of a terminal device, and control, based on the identification information of the terminal device, the communication interface to send third configuration information, where there is a correspondence between the third configuration information and a cell identifier of a second cell, and the cell identifier is an identifier of a cell in a radio access network-based notification area RNA.

A fourteenth aspect of embodiments of this application provides a computer-readable storage medium, including instructions. When the instructions are run on a computer, the computer is enabled to perform the method provided in the eleventh aspect.

A fifteenth aspect of embodiments of this application provides a chip system. The chip system includes a processor, and may further include a memory, configured to implement the method provided in the eleventh aspect. The chip system may include a chip, or may include a chip and another discrete component.

A sixteenth aspect of embodiments of this application provides a communication system. The communication system includes the terminal device according to the second aspect, and optionally further includes the first network device according to the seventh aspect and the second network device according to the twelfth aspect. Alternatively, the communication system includes the terminal device according to the third aspect, and optionally further includes the first network device according to the eighth aspect and the second network device according to the thirteenth aspect.

DESCRIPTION OF EMBODIMENTS

To better understand the technical solutions provided in embodiments of this application, technical terms in embodiments of this application are first described.
(1) RRC Connected Mode, RRC Idle Mode, and RRC Inactive Mode In a communication system, a terminal device may access a network device, and communicate with the accessed network device. In a process of accessing the network device or after accessing the network device, the terminal device may establish a radio resource control (RRC) connection to the network device. When the RRC connection is established, an RRC status of the terminal device is RRC connected mode.

In RRC connected mode, the terminal device may send uplink data to the network device through an uplink data channel such as a PUSCH. The uplink data may be, for example, unicast data for the terminal device. The terminal device may further receive downlink data from the network device through a downlink data channel such as a PDSCH. The downlink data may be, for example, unicast data for the terminal device.

The network device may switch, by using an RRC release process in which, for example, an RRC release message is sent to the terminal device, the terminal device from RRC connected mode to RRC idle mode, or switch the terminal device from RRC connected mode to RRC inactive mode.

When the terminal device is in RRC idle mode, a connection between the terminal device and the network device and a connection between the terminal device and a core network are released. In this case, the terminal device may receive one or more of a paging message, a broadcast channel, system information, or the like from the network device, but cannot perform unicast data transmission with the network device. For example, the terminal device cannot receive downlink data transmitted through a PDSCH from the network device, or cannot send uplink data to the network device through a PUSCH.

When the terminal device is in RRC inactive mode, a connection between the terminal device and the network device is released, but a connection between the terminal device and a core network can be maintained. In this case, the terminal device may receive one or more of a paging message, a broadcast channel, system information, or the like from the network device. Currently, for the terminal device in RRC inactive mode, the network device retains registration information of the terminal device, but suspends most air interface behaviors between the terminal device and the network device. For example, the terminal device suspends receiving a PDCCH for scheduling unicast transmission of the terminal device. It may be understood that, RRC inactive mode means a power-saving mode of the terminal device. However, according to embodiments of this application, the terminal device in RRC inactive mode may perform unicast data transmission with the network device.

Figure 1:
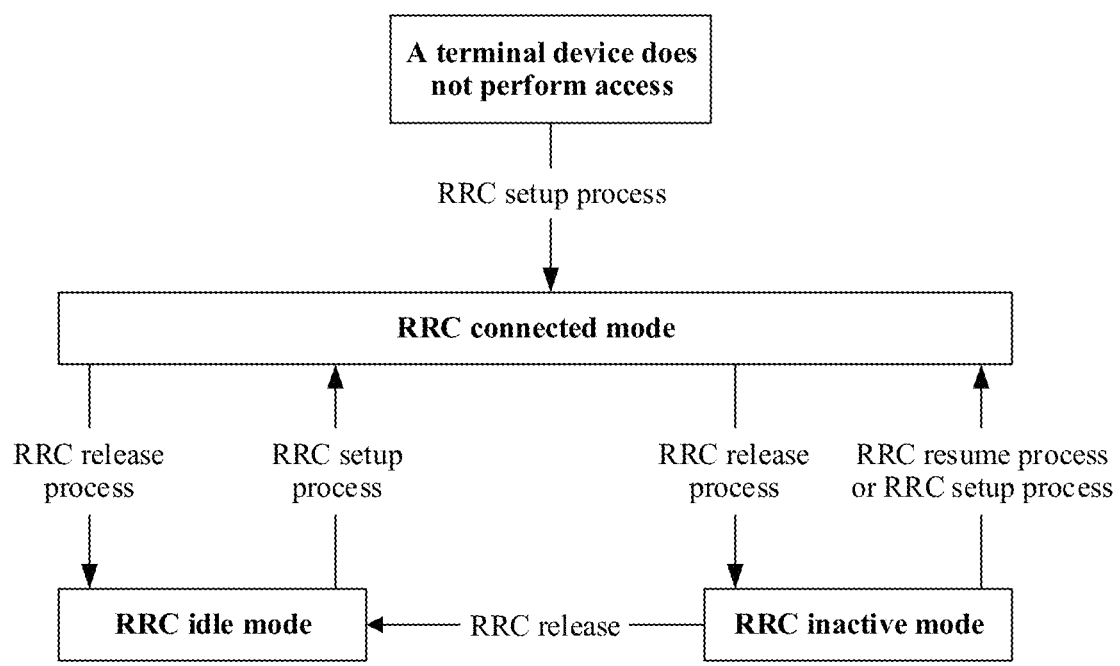
FIG. 1 is a schematic diagram of conversion between three RRC modes.

In a possible implementation, for switching between RRC connected mode, RRC idle mode, and RRC inactive mode, refer to FIG. 1. When the terminal device does not access the network device, the terminal device may establish an RRC connection to the network device by using an RRC setup process. When the RRC connection is established, the RRC status of the terminal device is RRC connected mode. The network device may switch, by using an RRC release process, the RRC status of the terminal device from RRC connected mode to RRC idle mode or RRC inactive mode.

The terminal device in RRC idle mode may switch, by using the RRC setup process, the RRC status of the terminal device from RRC idle mode to RRC connected mode. The RRC setup process initiated by the terminal device in RRC idle mode may be triggered by a paging message sent by the network device, or may be triggered by a higher layer of the terminal device. The higher layer of the terminal device triggers, for example, the terminal device to send data to the network device.

For the terminal device in RRC idle mode, the RRC setup process may include: The terminal device sends an RRC setup request message to the network device. When receiving the RRC setup request message, the network device may send an RRC setup message to the terminal device. The RRC setup message is used to indicate that the network device agrees to set up an RRC connection, so that the RRC status of the terminal device is switched from RRC idle mode to RRC connected mode. If the network device does not agree to set up an RRC connection, the network device may send an RRC reject message to the terminal device, so that the RRC status of the terminal device is still RRC idle mode.

The terminal device in RRC inactive mode may switch from RRC inactive mode to RRC connected mode by using the RRC setup process or an RRC resume process. The RRC resume process initiated by the terminal device in RRC inactive mode may be triggered by a paging message sent by the network device, or may be triggered by the higher layer of the terminal device. The network device may switch, by using an RRC release process, the RRC status of the terminal device from RRC inactive mode to RRC idle mode.

The RRC resume process may include: The terminal device sends an RRC resume request message to the network device. When receiving the RRC resume request message, the network device may send an RRC setup message or an RRC resume message to the terminal device, so that the RRC status of the terminal device is switched from RRC inactive mode to RRC connected mode. If the network device does not agree to set up or resume the RRC connection, the network device may send an RRC reject message to the terminal device, so that the RRC status of the terminal device is still RRC inactive mode.

RRC connected mode may also be described as RRC-connected mode, connected mode, or the like. RRC idle mode may also be described as RRC-idle mode, idle mode, or the like. RRC inactive mode may also be described as RRC-inactive mode, RRC deactivated mode, RRC third mode, or the like. In embodiments of this application, RRC connected mode, RRC idle mode, and RRC inactive mode are used as examples, and other names or terms used to describe the three modes should fall within the protection scope of embodiments of this application.

(2) Time-Frequency Resource for Downlink Control Information

Figure 2:
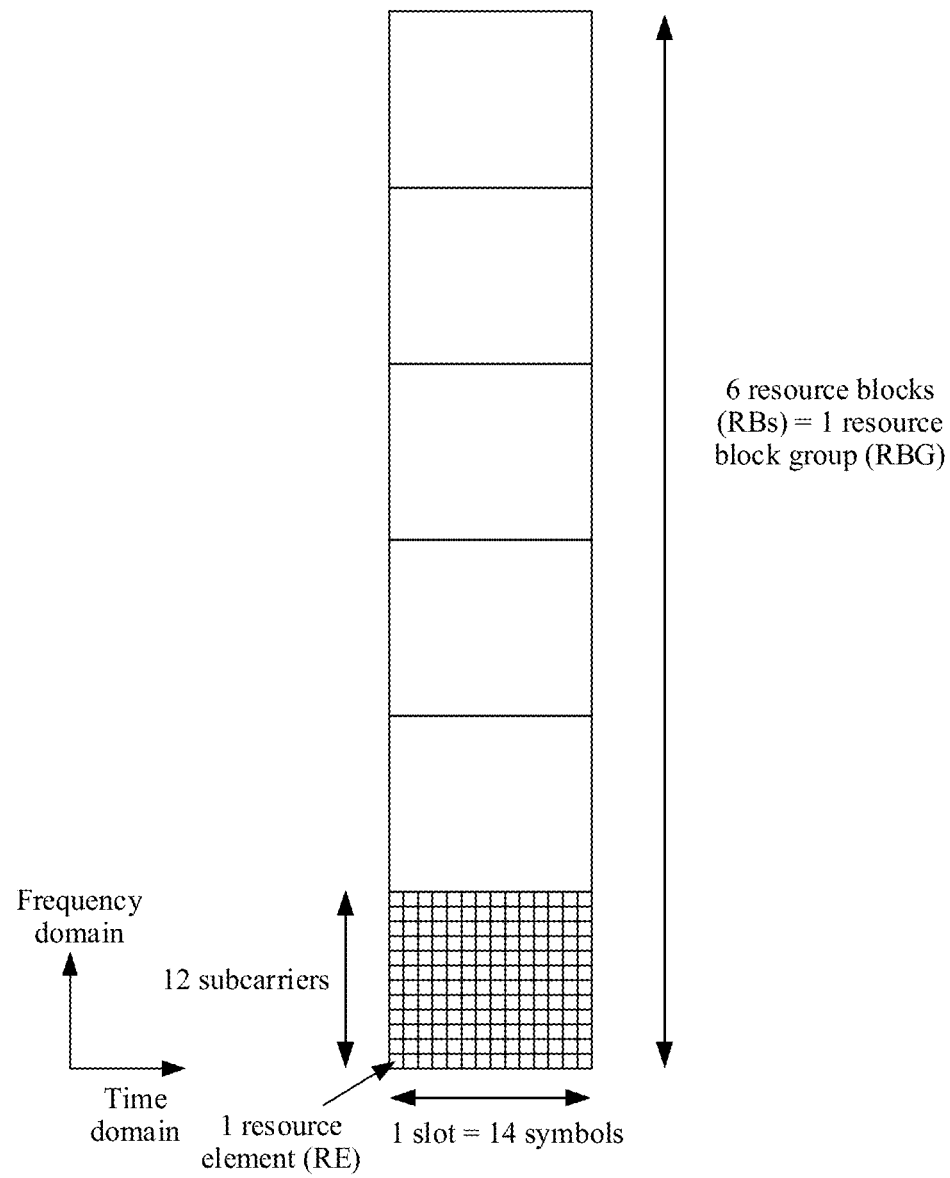
FIG. 2 is a schematic diagram of a time-frequency resource.

For ease of understanding of the time-frequency resource for the downlink control information, the time-frequency resource is first described. The time-frequency resource shown in FIG. 2 is used as an example. A specific value in FIG. 2 is used as an example, and does not constitute a limitation on embodiments of this application. In FIG. 2, one resource block group (RBG) includes six contiguous resource blocks (RB) in frequency domain; one RB includes 12 subcarriers in frequency domain; one slot usually includes 14 symbols in time domain; and one resource element (RE) includes one subcarrier in frequency domain and one symbol in time domain. The symbol may be an orthogonal frequency division multiplexing (OFDM) symbol, a discrete fourier transform spread spectrum orthogonal frequency division multiplexing (DFT-S-OFDM) symbol, or the like.

The time-frequency resource for the downlink control information may also be described as a time-frequency resource for searching for the downlink control information, a time-frequency resource for monitoring the downlink control information, a time-frequency resource range for searching for the downlink control information, or the like. The time-frequency resource for the downlink control information includes a time-frequency resource determined based on configuration information of a CORESET and configuration information of a SearchSpace, and the time-frequency resource is used to search for the downlink control information. In other words, configuration information of a CORESET and configuration information of a SearchSpace are used to indicate the time-frequency resource for the downlink control information.

For example, the configuration information of the CORESET is used to configure positions of frequency domain resources (frequencyDomainResources) and time domain resource duration. frequencyDomainResources may indicate, by using a bitmap, an RBG available for the terminal device in frequency domain. Each bit in the bitmap indicates whether a corresponding RBG belongs to the CORESET. For example, if a value of a bit in the bitmap is "1", it indicates that an RBG corresponding to the bit belongs to the CORESET; or if a value of a bit is "0", it indicates that an RBG corresponding to the bit does not belong to the CORESET. The time domain resource duration (duration) is used to configure a quantity of symbols occupied by a CORESET, and has a value range of usually 1 to 3, indicating that one, two, or three symbols are occupied. The time domain resource duration (duration) in the configuration information of the CORESET is used to configure time domain duration for searching for the DCI. A specific time-domain position for searching for the DCI may be configured by using the configuration information of the SearchSpace.

For example, the configuration information of the SearchSpace is used to configure a monitoring periodicity and an offset (monitoringSlotPeriodicityAndOffset), monitoring slot duration (duration), and a monitoring symbol position (monitoringSymbolsWithinSlot). monitoringSlotPeriodicityAndOffset is used to configure a periodicity and an offset (offset) of a SearchSpace, so as to determine a start slot (slot) position of the SearchSpace in the periodicity. offset refers to an offset of a start slot of the SearchSpace in a periodicity relative to a start slot of the periodicity. The unit of monitoringSlotPeriodicityAndOffset is a slot. For example, monitoringSlotPeriodicityAndOffset=(10,4) indicates that the periodicity of the SearchSpace is 10 slots, and the offset of the start slot of the SearchSpace relative to the start slot of the periodicity is four slots. The monitoring slot duration (duration) is used to configure a quantity of contiguous slots occupied by the SearchSpace. monitoringSymbolsWithinSlot is used to configure a position of a start symbol in a slot.

Figure 3:
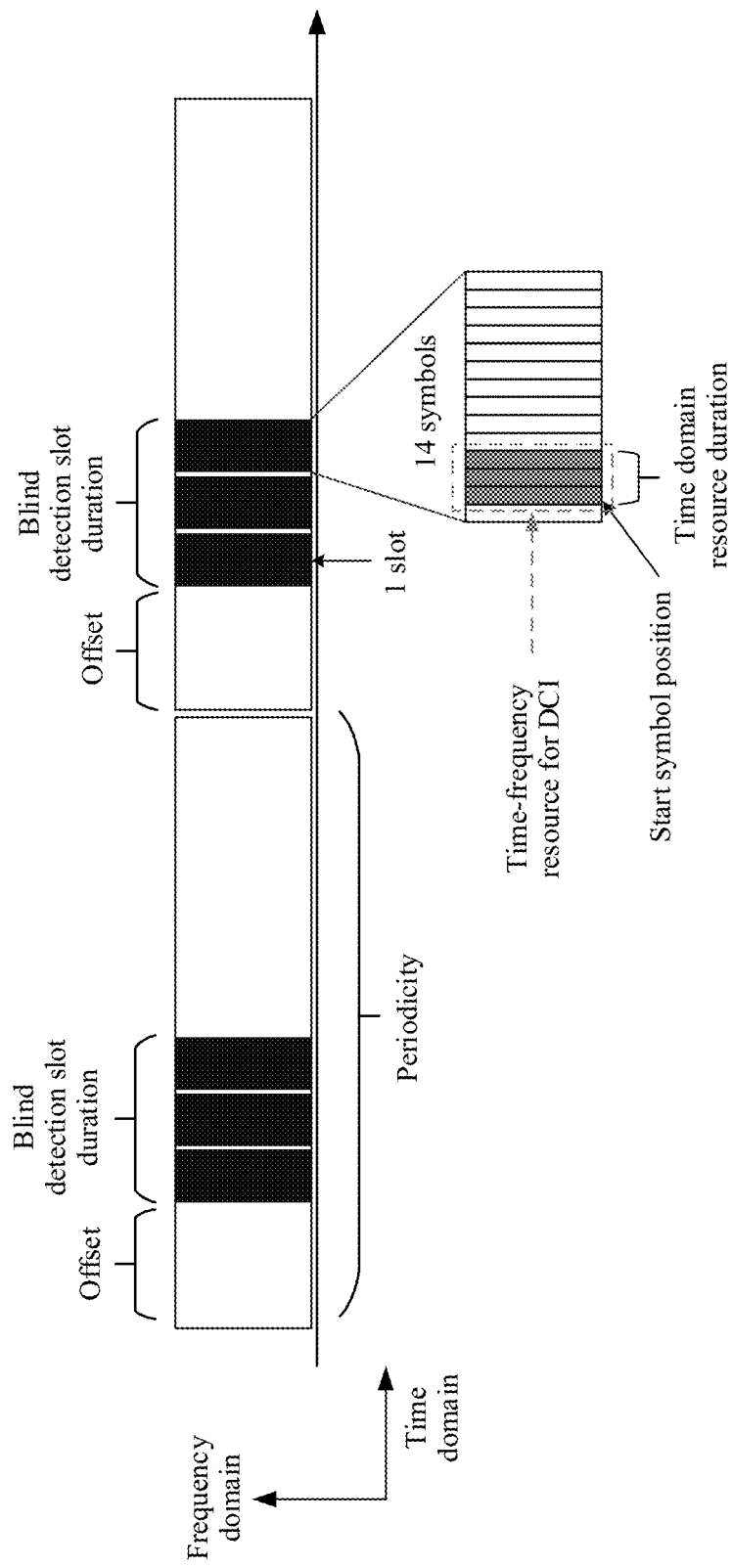
FIG. 3 is an example diagram of configuration information of a control resource set and configuration information of a search space.

For example, the configuration information of the CORESET and the configuration information of the SearchSpace are described by using FIG. 3 as an example. In FIG. 3, monitoringSlotPeriodicityAndOffset in the configuration information of the SearchSpace is used to indicate the periodicity and the offset of the SearchSpace, that is, indicate a start slot position of the SearchSpace in the periodicity, and the monitoring slot duration (duration) is used to indicate that the SearchSpace occupies three contiguous slots. It may be determined, based on monitoringSlotPeriodicityAndOffset and the monitoring slot duration (duration), that there may be DCI in three slots in one periodicity. The three slots are three rectangular blocks with a black background in one periodicity in FIG. 3, and one black rectangular block represents one slot. monitoringSymbolsWithinSlot is used to indicate a position of a start symbol in a slot, and the start symbol in FIG. 3 is the second symbol in the slot. The time domain resource duration (duration) in the CORESET is used to indicate time domain duration that may be used to search for the DCI and that is in a slot. In FIG. 3, the time domain resource duration (duration) is 3, indicating that a quantity of symbols for searching for the DCI once is 3. Based on the configuration information of the CORESET and the configuration information of the SearchSpace, it may be determined that a time-frequency resource represented by a rectangular block with a gray background in FIG. 3 is the time-frequency resource for searching for the DCI. In each rectangular block with a black background, there is a rectangular block with a gray background used as the time-frequency resource for searching for the DCI.

(3) Radio Network Temporary Identifier (RNTI)

The RNTI may be used to identify different terminal devices in a network. For example, Table 1 below lists value ranges of different RNTIs.

TABLE 1

| Value (Hexadecimal) | RNTI |
|---|---|
| 0000 | N/A |
| 0001-FFEF | random access-RNTI (random access-RNTI, RA-RNTI); temporary cell-RNTI (temporary cell-RNTI, Temporary C-RNTI); cell-RNTI (cell-RNTI, C-RNTI); modulation and coding scheme-cell-RNTI (modulation and coding scheme-cell-RNTI, MCS-C-RNTI); configured scheduling-RNTI (configured scheduling-RNTI, CS-RNTI). transmit power control-physical uplink control channel-RNTI (transmit power control-physical uplink control channel-RNTI, TPC-PUCCH-RNTI)); transmit power control-physical uplink shared channel-RNTI (transmit power control-physical uplink shared channel-RNTI, TPC-PUSCH-RNTI)); transmit power control-sounding reference signal-RNTI (transmit power control-sounding reference signal-RNTI, TPC-SRS-RNTI); interruption RNTI (interruption-RNTI, INT-RNTI); slot format indicator-RNTI (slot format indicator, SFI-RNTI); semi-persistent channel state information-RNTI (semi-persistent channel state information RNTI, SP-CSI-RNTI) |
| FFF0-FFFD | reserved (reserved) |
| FFFE | paging RNTI (paging-RNTI, P-RNTI) |
| FFFF | system Information RNTI (system information-RNTI, SI-RNTI) |

In Table 1, for an RNTI in a range of 0001 to FFEF (hexadecimal), the network device may configure an RNTI value, and allocate the RNTI value to the terminal device, so that the terminal device can perform random access, uplink and downlink scheduling, power control, frame structure configuration, or the like.

In different scenarios, the RNTI may be shared. For example, the network device may configure a same RNTI value for a plurality of terminal devices. Alternatively, the RNTI may be dedicated to the terminal device. For example, the network device configures different RNTI values for different terminal devices. Usually, for a same time-frequency resource for the DCI, the network device configures different RNTIs for different terminal devices, so that the different terminal devices can distinguish between DCIs of the different terminal devices by using the RNTIs. For example, terminal device 1 searches for DCI based on a time-frequency resource for the DCI, and descrambles a CRC of the DCI by using an RNTI. If descrambling succeeds, terminal device 1 may obtain content of the DCI.

(4) Inactive-RNTI (I-RNTI) and Notification Area

The I-RNTI is configured by the network device for the terminal device in RRC inactive mode, and is a bit string with a length of 40 bits. The I-RNTI is unique in the notification area configured by the network device for the terminal device. The network device may configure the notification area for the terminal device in an RRC release process. For example, an RRC release message is used to configure the notification area. The terminal device in RRC inactive mode may move in the notification area. The notification area may also be described as a radio access network-based notification area (RNA), a movement range, or the like. In embodiments of this application, for example, the notification area is described as the RNA. The RNA may include a coverage area of one or more network devices.

Figure 4:
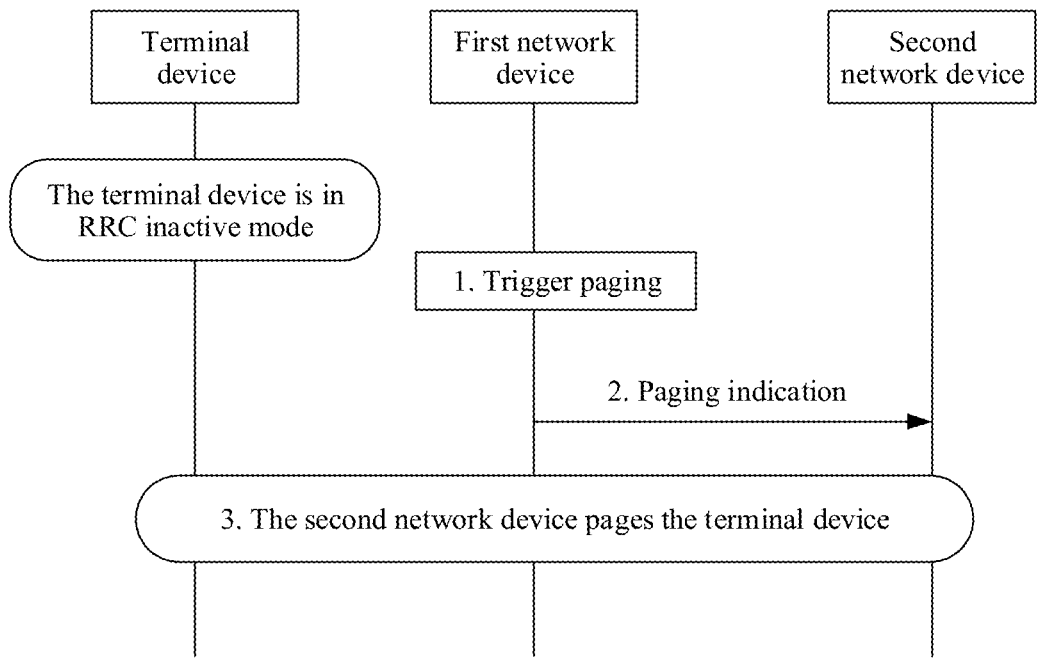
FIG. 4 is a schematic diagram of a paging process.

In the RNA, the terminal device in RRC inactive mode may determine, based on whether a paging message includes an I-RNTI dedicated to the terminal device, whether the terminal device is paged. For details, refer to a paging process shown in FIG. 4. In FIG. 4, a first network device is a network device that triggers the terminal device to switch from RRC connected mode to RRC inactive mode, that is, a network device that establishes an RRC connection to the terminal device before the terminal device switches to RRC inactive mode; a second network device is a network device in the RNA. There may be one or more second network devices. The RNA includes a coverage area of the second network device, and may include a coverage area of the first network device, or may not include a coverage area of the first network device. This depends on the RNA that is configured by the first network device for the terminal device. The RNA may include a coverage area of one or more second network devices.

A core network element considers that the terminal device in RRC inactive mode is still within the coverage area of the first network device. Therefore, when a network side needs to send a downlink message, the core network element sends a paging message to the first network device, to trigger paging performed by the first network device, that is, step 1 in FIG. 4. The first network device does not know a specific coverage area of a specific second network device in the RNA in which the terminal device in RRC inactive mode is located, and therefore the first network device sends a paging indication to the second network device in the RNA, that is, step 2 in FIG. 4. The second network device initiates paging to the terminal device on a paging occasion, that is, step 3 in FIG. 4.

The second network device initiates paging by sending a paging message to the terminal device. A PDSCH carrying the paging message is scheduled by using DCI, and a CRC of the DCI is scrambled by using the P-RNTI (with a value of FFFE, hexadecimal) in Table 1. It may be understood that paging messages sent by the network device to a plurality of terminal devices are scheduled by using DCI scrambled by using a same P-RNTI. The paging message may include identifiers (ID) of 32 terminal devices. The identifier of the terminal device may be an I-RNTI or a next generation-5th generation-temporary mobile subscriber identity (NG-5G-S-TMSI). The I-RNTI is used to page the terminal device in RRC inactive mode, that is, page an I-RNTI used by the terminal device in RRC inactive mode. The NG-5G-S-TMSI is used to page the terminal device in the RRC idle mode, that is, page an NG-5G-S-TMSI used by the terminal device in the RRC idle mode. It may be understood that the paging message includes the I-RNTI used to page the terminal device in RRC inactive mode, and paging messages for different terminal devices carry different I-RNTIs.

The terminal device descrambles the DCI by using the P-RNTI, reads the paging message based on an indication of the DCI, and determines, based on whether the paging message includes the I-RNTI of the terminal device, whether the network side pages the terminal device.

For example, terminal device 1 and terminal device 2 in RRC inactive mode succeed in descrambling the DCI by using the P-RNTI, and receive a paging message scheduled by using the DCI. The paging message includes I-RNTI A, and I-RNTI A is an I-RNTI of terminal device 1. In this case, terminal device 1 determines that terminal device 1 is paged. An I-RNTI of terminal device 2 is I-RNTI B, and does not match I-RNTI A included in the paging message. Terminal device 2 determines that terminal device 2 is not paged.

The P-RNTI is used to scramble and descramble DCI in broadcast information/multicast information, but all paged terminal devices descramble the DCI in the broadcast information/multicast information by using the P-RNTI. In other words, the P-RNTI is not dedicated to the terminal device. In other words, different RNTIs used for scrambling and descrambling are not configured for different terminal devices. The RNTI dedicated to the terminal device may also be understood as that RNTIs used by different terminal devices are different in a specific time-frequency resource for DCI in a cell. I-RNTIs are different for different terminal devices, but the I-RNTIs are not used for scrambling and descrambling the DCI. Therefore, the terminal device in RRC inactive mode cannot obtain a dedicated RNTI used to descramble the DCI. In view of this, embodiments of this application provide a configuration information obtaining method and an apparatus, so that the terminal device can obtain a dedicated RNTI used by the terminal device in RRC inactive mode, and the RNTI can be used to descramble the DCI. Further, the terminal device may obtain the DCI, and may receive downlink data based on the DCI. Optionally, the RNTI is further used to send uplink control information and/or uplink data. According to embodiments of this application, data transmission between the terminal device in RRC inactive mode and the network device can be implemented.

The following describes technical solutions in embodiments of this application with reference to the accompanying drawings in embodiments of this application. Unless otherwise specified, "/" in descriptions of embodiments of this application represents an "or" relationship between associated objects. For example, A/B may represent A or B. In addition, in the descriptions of this application, "a plurality of" means two or more unless otherwise specified. "One or more of the following items (pieces)" or a similar expression thereof refers to any combination of these items, including any combination of singular items (pieces) or plural items (pieces). For example, one or more of a, b, or c may represent a, b, c, a and b, a and c, b and c, or a and b and c, where a, b, and c may be singular or plural. In addition, to clearly describe the technical solutions in embodiments of this application, terms such as "first" and "second" are used in embodiments of this application to distinguish between technical features that have basically same or similar functions and purposes. A person skilled in the art may understand that the terms such as "first" and "second" do not limit a quantity or an execution sequence, and the terms such as "first" and "second" do not indicate a definite difference.

Technologies described in embodiments of this application may be applied to various communication systems, for example, a 4th generation (4G) communication system, a 4.5G communication system, a 5G communication system, a system integrating a plurality of communication systems, and a future evolved communication system. The communication systems include, for example, a long term evolution (LTE) system, a new radio (NR) system, a wireless fidelity (Wi-Fi) system, a communication system related to the 3rd generation partnership project (3GPP), and another communication system of this type.

The terminal device (or referred to as a terminal) in embodiments of this application may be a device having wireless receiving and sending functions. The terminal device may be deployed on land, including an indoor device, an outdoor device, a handheld device, or a vehicle-mounted device; may be deployed on the surface of water (such as in a steamship); or may be deployed in the air (such as on an airplane, a balloon, and a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having a wireless transceiver function. The terminal device may alternatively be a virtual reality (VR) terminal device, an augmented reality (AR) terminal device, a smart vehicle terminal device, a wireless terminal in industrial control, a wireless terminal in unmanned driving, a wireless terminal in telemedicine, a wireless terminal in a smart grid, a wireless terminal in a smart city, a wireless terminal in a smart home (smart home), or the like. In embodiments of this application, an apparatus configured to implement a function of the terminal device may be a terminal device, or may be an apparatus that can support the terminal device in implementing the function, for example, a chip system. The apparatus may be installed in the terminal device or used together with the terminal device. In the technical solutions provided in embodiments of this application, the technical solutions provided in embodiments of this application are described by using an example in which an apparatus configured to implement functions of the terminal device is a terminal device.

By way of example and not limitation, the terminal in this application may alternatively be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn by a user or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In this application, the terminal may be a terminal in an internet of things (IoT) system. IoT is an important component in development of future information technologies. A main technical feature of the IoT is to connect an object to a network by using a communication technology, to implement an intelligent network of human-machine interconnection and thing-thing interconnection. The terminal in this application may alternatively be a terminal in machine type communication (MTC). The terminal in this application may be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement a method in this application. Therefore, embodiments of this application may be applied to the internet of vehicles, for example, vehicle to everything (V2X), long term evolution-vehicle (LTE-V), or vehicle-to-vehicle (V2V).

The network device in embodiments of this application may include a base station (BS), and may be a device that is deployed in a radio access network and that can perform wireless communication with the terminal device. The base station may be in a plurality of forms, such as a macro base station, a micro base station, a relay node, and an access point. For example, the network device in embodiments of this application may be a base station in 5G or a base station in long term evolution (LTE). The base station in 5G may also be referred to as a transmission reception point (TRP) or a next generation base station NodeB (gNB). In embodiments of this application, an apparatus configured to implement a function of the network device may be a network device, or may be an apparatus that can support the network device in implementing the function, for example, a chip system. The apparatus may be installed in the network device or used together with the network device. In embodiments of this application, a chip system may include a chip, or may include a chip and another discrete component. In the technical solutions provided in embodiments of this application, the technical solutions provided in embodiments of this application are described by using an example in which an apparatus configured to implement functions of the network device is a network device.

Embodiments of this application further relate to a core network (core network) element. The core network element may also be described as a core network device, a core network function entity, or the like, and is a network element that is in a core network and that provides service support for the terminal device. The core network element may be a core network element in an LTE system, a core network element in a 5G system, or a core network element in a future communication system. The 5G system is used as an example. The core network element may include an access and mobility management function (AMF) entity, a session management function (SMF) entity, a user plane function (UPF) entity, and the like. The AMF entity may be responsible for access management and mobility management of the terminal device. The SMF entity may be responsible for session management, for example, session establishment. The UPF entity may be responsible for connecting to an external network, for example, receiving data from the external network, and transmitting the data to the terminal device by using the network device. It should be noted that the entity in embodiments of this application may also be described as a network element, a function entity, or the like. For example, the AMF entity may also be described as an AMF network element, an AMF function entity, or an AMF.

Figure 5:
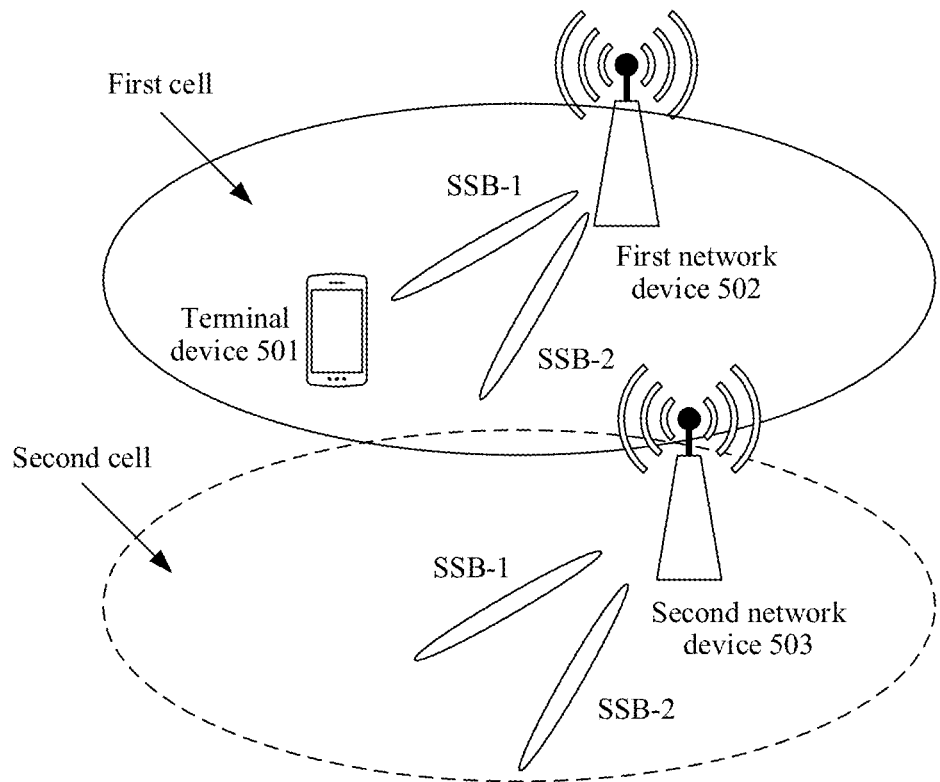
FIG. 5 is a schematic diagram of a network architecture to which an embodiment of this application is applied.

FIG. 5 is a schematic diagram of a network architecture to which an embodiment of this application is applied. The network architecture includes a terminal device 501, a first network device 502, and a second network device 503. It should be noted that a device form and a device quantity shown in FIG. 5 are used as an example, and do not constitute a limitation on this embodiment of this application. For example, a plurality of second network devices may be included.

In an implementation, the first network device 502 may be a network device that establishes an RRC connection to the terminal device 501 before the terminal device 501 switches to RRC inactive mode. The second network device 503 may be a network device in an RNA of the terminal device 501. There may be more than one second network device 503, and a specific quantity depends on an actual case. The RNA of the terminal device 501 is a movement range of the terminal device 501 in RRC inactive mode. A specific range of the RNA is determined by an AMF entity.

In the network architecture shown in FIG. 5, a coverage area of the first network device 502 includes a first cell, the first cell is a cell on which the terminal device 501 camps when the terminal device 501 is in RRC connected mode, and the first network device 502 sends an SSB in the first cell; a coverage area of the second network device 503 includes a second cell, and the second network device 503 sends an SSB in the second cell. When the terminal device 501 moves out of the first cell, for example, moves from the first cell to the second cell, the first network device 502 may trigger the terminal device 501 to switch from RRC connected mode to RRC inactive mode. The second cell may be a cell in the RNA. If the RNA may include the first cell, the second cell is a cell other than the first cell in the RNA. If the RNA may not include the first cell, the second cell is any cell in the RNA.

After switching from RRC connected mode to RRC inactive mode, the terminal device 501 may obtain a cell identifier based on a found synchronization signal block, and obtain configuration information based on the cell identifier. The configuration information is used to configure an RNTI, and there is a correspondence between the cell identifier and the configuration information, so that the terminal device 501 can obtain an RNTI used by the terminal device 501 in RRC inactive mode. When obtaining the RNTI, the terminal device 501 in RRC inactive mode may descramble DCI based on the RNTI, to obtain content of the DCI. Further, the terminal device 501 may receive downlink data based on a PDSCH scheduled by using the DCI. Alternatively, when obtaining the RNTI, the terminal device 501 in RRC inactive mode may directly receive downlink data based on the RNTI. When obtaining the RNTI, the terminal device 501 in RRC inactive mode may scramble uplink control information based on the RNTI, to send the uplink control information. Further, the uplink control information may be used to schedule uplink data, so that the uplink data is sent. Alternatively, when obtaining the RNTI, the terminal device 501 in RRC inactive mode may directly send uplink data based on the RNTI. Different terminal devices in RRC inactive mode may obtain different RNTIs, so that the terminal device can obtain a dedicated RNTI.

In an implementation, the first network device 502 may be a network device connected to the terminal device 501 before the terminal device 501 moves; the second network device 503 may be a network device connected to or to be connected to the terminal device 501 after the terminal device 501 moves. A coverage area of the first network device 502 is a first cell, and the first cell may be a cell in which the terminal device 501 is located before the terminal device 501 moves; a coverage area of the second network device 503 is a second cell, and the second cell may be a cell in which the terminal device 501 is located after the terminal device 501 moves.

After moving, the terminal device 501 obtains a cell identifier of the second cell, and obtains configuration information based on the cell identifier. The configuration information is used to configure an RNTI, and there is a correspondence between the cell identifier and the configuration information, so that the terminal device 501 that has moved can obtain the RNTI.

Figure 6:
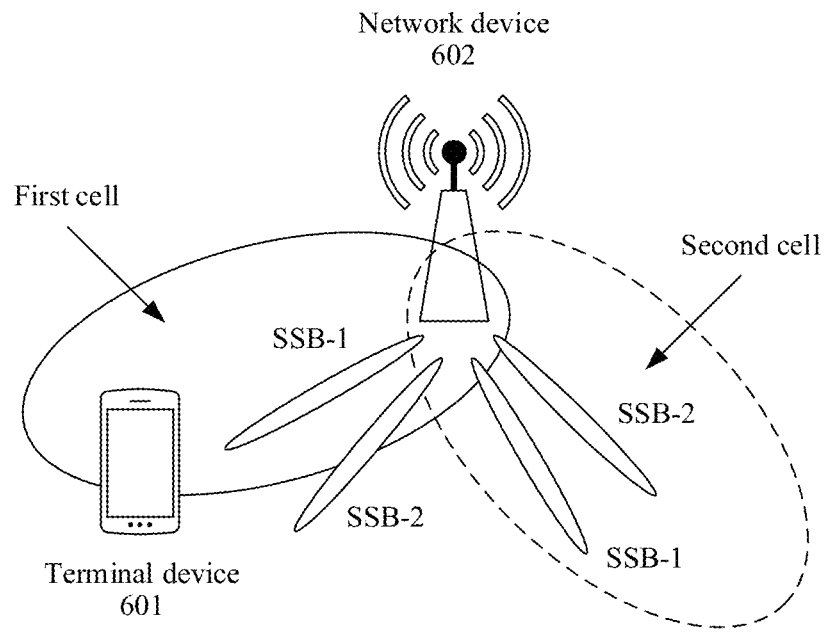
FIG. 6 is a schematic diagram of another network architecture to which an embodiment of this application is applied.

FIG. 6 is a schematic diagram of another network architecture to which an embodiment of this application is applied. The network architecture includes a terminal device 601 and a network device 602. It should be noted that a device form and a device quantity shown in FIG. 6 are used as an example, and do not constitute a limitation on this embodiment of this application.

A difference between FIG. 6 and FIG. 5 lies in that, in FIG. 6, a coverage area of the network device 602 includes a first cell and a second cell. The first cell is a cell on which the terminal device 601 camps when the terminal device 601 is in RRC connected mode. In actual application, there may be a plurality of second cells. When the terminal device 601 moves out of the first cell, for example, moves from the first cell to the second cell, the network device 602 may trigger the terminal device 601 to switch from RRC connected mode to RRC inactive mode. The second cell may be a cell in an RNA. The network device 602 may send SSBs in one cell, for example, send SSBs in the first cell. Alternatively, the network device 602 may send SSBs in a plurality of cells. For example, some SSBs are sent in the first cell, and the other SSBs are sent in the second cell.

After switching from RRC connected mode to RRC inactive mode, the terminal device 601 finds a synchronization signal block in the second cell, obtains a cell identifier of the second cell, and obtains configuration information based on the cell identifier. The configuration information is used to configure an RNTI. Therefore, the terminal device 601 in RRC inactive mode may receive DCI in the second cell based on the RNTI, and further receive downlink data in the second cell. The terminal device 601 in RRC inactive mode may also send uplink control information in the second cell based on the RNTI, and further send uplink data in the second cell. Different terminal devices in RRC inactive mode may obtain different RNTIs, so that the terminal device can obtain a dedicated RNTI.

A network architecture and a service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to a similar technical problem.

The following describes the configuration information obtaining method provided in embodiments of this application with reference to the accompanying drawings. It should be noted that, in the descriptions, names of information or data exchanged between the terminal device and the network device are used as examples, and do not constitute a limitation on embodiments of this application.

Figure 7:
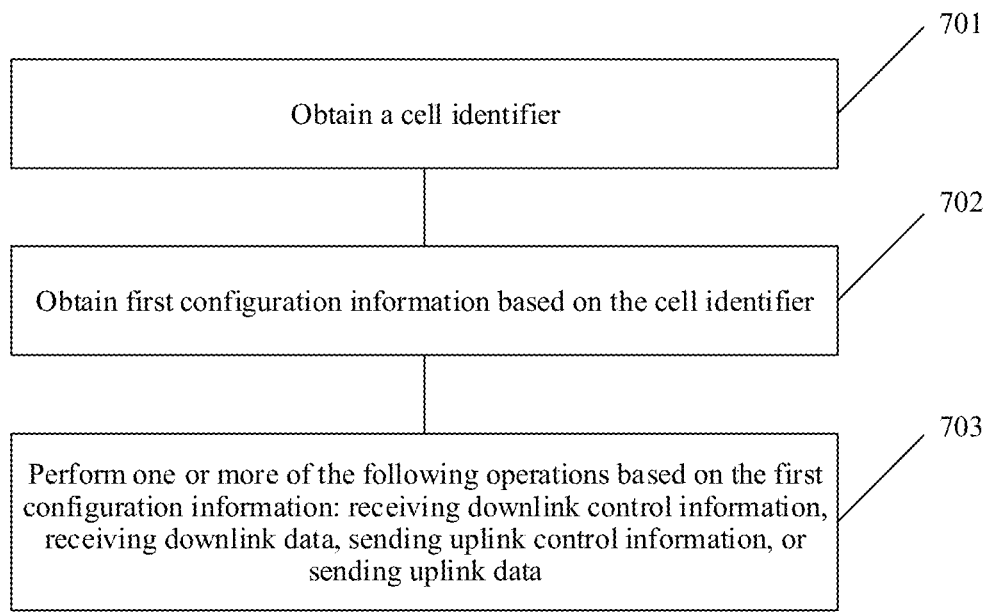
FIG. 7 is a schematic flowchart of a configuration information obtaining method according to an embodiment of this application.

FIG. 7 is a schematic flowchart of a configuration information obtaining method according to an embodiment of this application. The procedure may include but is not limited to the following steps.

Step 701: Obtain a cell identifier.

A coverage area of a network device may include one or more cells (cells). For example, the coverage area of the network device may include three cells. The cell identifier (cell ID) may also be described as a cell identification code, a cell number, area identifier information, or the like, and is used to distinguish between different cells. In embodiments of this application, the two names, namely, the cell and the cell identifier, are used as examples, and do not constitute a limitation on embodiments of this application.

The terminal device obtains the cell identifier. In an implementation, the terminal device may obtain the cell identifier by using a detected SSB.

For example, when the terminal device needs to determine a cell to be camped on and/or perform downlink synchronization, the terminal device searches for the SSB at a predefined frequency or within a predefined frequency range. The SSB includes a primary synchronization signal (PSS), a secondary synchronization signal (SSS), and a physical broadcast channel (physical broadcast channel, PBCH). The following describes the PSS and the SSS by using an example.

A sequence value $d_{PSS}$ of the PSS has three candidate sequences based on different values of $N_{ID}^{(2)}$. The sequence value may be represented as:

$$d_{PSS}(n)=1-2*x(m), m=(n+43*N_{ID}^{(2)}) \bmod 127, 0 \leq n < 127$$

Herein, $N_{ID}^{(2)} \in \{0, 1, 2\}$, $x(i+7)=(x(i+4)+x(i)) \bmod 2$, and $[x(6)\ x(5)\ x(4)\ x(3)\ x(2)\ x(1)\ x(0)]=[1\ 1\ 1\ 0\ 1\ 1\ 0]$. $d_{PSS}$ has a sequence length of 128, and $d_{PSS}(n)$ indicates an $n^{th}$ element in $d_{PSS}$.

A sequence value of the $d_{SSS}$ of the SSS has 336 candidate sequences based on different values of $N_{ID}^{(1)}$. The sequence value may be represented as:

$$d_{SSS}(n) = [1 - 2*x_0((n+m_0) \bmod 127)] * [1 - 2*x_1((n+m_1) \bmod 127)] \quad (1)$$

$$m_0 = 15 * \left\lfloor \frac{N_{ID}^{(1)}}{112} \right\rfloor + 5 * N_{ID}^{(2)}, m_1 = N_{ID}^{(1)} \bmod 112, 0 \leq n < 127$$

Herein, $N_{ID}^{(1)} \in \{0, 1, \ldots, 335\}$, $x_0(i+7)=(x_0(i+4)+x_0(i)) \bmod 2$, $x_1(i+7)=(x_1(i+1)+x_1(i)) \bmod 2$ $[x_0(6)\ x_0(5)\ x_0(4)\ x_0(3)\ x_0(2)\ x_0(1)\ x_0(0)]=[0\ 0\ 0\ 0\ 0\ 0\ 1]$, and $[x_1(6)\ x_1(5)\ x_1(4)\ x_1(3)\ x_1(2)\ x_1(1)\ x_1(0)]=[0\ 0\ 0\ 0\ 0\ 0\ 1]$ $d_{SSS}$ has a sequence length of 128, and $d_{SSS}(n)$ indicates an $n^{th}$ element in $d_{SSS}$.

The terminal device may obtain a pattern of the PSS through sequence detection, and then determine $N_{ID}^{(2)}$. The terminal device may obtain a pattern of the SSS through sequence detection, and then determine $N_{ID}^{(1)}$. The terminal device may obtain the cell ID based on $N_{ID}^{(cell)}=336*N_{ID}^{(2)}+N_{ID}^{(1)}$, where $N_{ID}^{(cell)}$ represents the cell ID.

Optionally, the terminal device may obtain a synchronization signal block index (SSB index) by using a detected SSB. The synchronization signal block index is an index of the detected SSB. The terminal device may determine the index of the SSB based on a PBCH demodulation reference signal (DMRS) sequence and/or a PBCH payload in the SSB.

Step 702: Obtain first configuration information based on the cell identifier.

The terminal device may obtain the first configuration information based on the cell identifier. There is a correspondence between the cell identifier and the first configuration information. The cell identifier may be a cell identifier obtained by using the detected SSB, and the cell identifier may be an identifier of a cell in an RNA configured for the terminal device.

In an implementation, the network device may notify the terminal device of the correspondence. For example, the terminal device receives second configuration information, and the second configuration information is used to configure the correspondence between the cell identifier and the first configuration information. The second configuration information may be sent by a first network device to the terminal device, and the first network device is a network device connected to the terminal device when the terminal device is in RRC connected mode. In addition to being used to configure the correspondence between the cell identifier and the first configuration information, the second configuration information may be further used to configure a correspondence between a cell identifier of another cell in the RNA and another piece of first configuration information. The another cell is a cell, other than a cell identified by the cell identifier, in the RNA. The another piece of first configuration information is first configuration information corresponding to the another cell. For example, the cell identifier is cell ID 1, the first configuration information corresponding to the cell identifier is first configuration information A, and the RNA includes cell ID 1, cell ID 2, and cell ID 3. The second configuration information may be used to configure a correspondence between cell ID 1 and first configuration information A, a correspondence between cell ID 2 and first configuration information B, and a correspondence between cell ID 3 and first configuration information C. When obtaining the cell identifier, the terminal device may obtain, based on the correspondences configured by using the second configuration information, the first configuration information corresponding to the cell identifier. In another implementation, the correspondence may be predefined. For example, a correspondence between one or more cell identifiers and one or more pieces of first configuration information is defined in a protocol. In this case, when obtaining the cell identifier, the terminal device may obtain, based on the correspondence, the first configuration information corresponding to the cell identifier.

That the terminal device obtains the first configuration information based on the cell identifier may be implemented in one or more of the following manners:

Manner 1: The first configuration information is used to configure an RNTI, and the correspondence between the cell identifier and the first configuration information may be indicated as a correspondence between the cell identifier and the RNTI. When obtaining the cell identifier, the terminal device may obtain the RNTI based on the correspondence between the cell identifier and the RNTI.

Manner 2: The first configuration information is used to configure an RNTI and a time-frequency resource for DCI, and the correspondence between the cell identifier and the first configuration information may be indicated as a correspondence between the cell identifier and the RNTI and the time-frequency resource for the DCI. When obtaining the cell identifier, the terminal device may obtain the RNTI and the time-frequency resource for the DCI based on the correspondence between the cell identifier and the RNTI and the time-frequency resource for the DCI.

Manner 3: The first configuration information is used to configure an RNTI and a time-frequency resource for DCI, and the correspondence between the cell identifier and the first configuration information may be indicated as a correspondence between the cell identifier and the RNTI and the time-frequency resource for the DCI. In addition, there is also a correspondence between the time-frequency resource for the DCI and the synchronization signal block index. When obtaining the cell identifier and the synchronization signal block index, the terminal device may obtain the RNTI based on the correspondence between the cell identifier and the RNTI, and may obtain the time-frequency resource for the DCI based on the correspondence between the cell identifier and the time-frequency resource for the DCI and the correspondence between the synchronization signal block index and the time-frequency resource for the DCI.

A value of the RNTI in the foregoing three manners may be any value in the value range in Table 1. The RNTI may be a newly defined RNTI, or may reuse one of the plurality of RNTIs in Table 1.

In this embodiment of this application, "used to configure" may be understood as "including", "used to indicate", "used to determine", or the like.

In addition to being used to configure the RNTI, or in addition to being used to configure the RNTI and the time-frequency resource for the DCI, the first configuration information may be further used to configure an available uplink configured-grant (CG) resource. The available uplink CG resource may be used by the terminal device to send uplink control information and/or uplink data.

In an implementation, the uplink CG resource configured by using the first configuration information is configured by using one or more of a time domain resource periodicity, an open-loop power control—related parameter, a waveform, a redundancy version sequence, a repetition quantity, a frequency hopping mode, a resource allocation type, a hybrid automatic repeat request (HARQ) process quantity, a demodulation reference signal (DMRS)-related parameter, a modulation and coding scheme (MCS) table, a resource block group (RBG) size, a time domain resource, a frequency domain resource, or an MCS.

In another implementation, one or more of a time domain resource periodicity, an open-loop power control—related parameter, a waveform, a redundancy version sequence, a repetition quantity, a frequency hopping mode, a resource allocation type, a HARQ process quantity, a demodulation reference signal-related parameter, an MCS table, or an RBG size is configured by using the first configuration information. Then, DCI scrambled by using an RNTI configured by using the first configuration information is used to activate CG-based PUSCH transmission. The DCI may indicate one or more of a time domain resource, a frequency domain resource, a DMRS, or an MCS.

Step 703: Perform one or more of the following operations based on the first configuration information:
receiving the downlink control information, receiving downlink data, sending the uplink control information, or sending the uplink data.

In an implementation of receiving the downlink control information based on the first configuration information, if the first configuration information is used to configure an RNTI, the terminal device descrambles a CRC of the DCI by using the RNTI. If descrambling succeeds, the terminal device may receive and obtain content of the DCI. Optionally, the first configuration information is further used to configure a time-frequency resource for the DCI. In this case, the terminal device monitors the DCI on the time-frequency resource for the DCI, and descrambles the CRC of the DCI by using an RNTI. If descrambling succeeds, the terminal device may receive and obtain content of the DCI. For example, the terminal device obtains indication information in the DCI, where the indication information is used to indicate a time-frequency resource for a PDSCH.

In an implementation of receiving the downlink data based on the first configuration information, the first configuration information is used to configure an RNTI and the time-frequency resource for the DCI. When obtaining the DCI based on the RNTI and the time-frequency resource for the DCI, the terminal device receives the downlink data scheduled by using the DCI. For example, if the DCI includes the indication information used to indicate the time-frequency resource for the PDSCH, the terminal device may receive, based on the indication information, the downlink data carried on the PDSCH.

Optionally, when obtaining the DCI, the terminal device sends the uplink control information and/or the uplink data based on the indication information in the DCI. The indication information may be used to indicate a time-frequency resource for the uplink control information and/or the uplink data.

In an implementation of sending the uplink control information based on the first configuration information, the first configuration information is used to configure an uplink CG resource and an RNTI. The terminal device generates a sequence by using the RNTI, scrambles the uplink control information by using the sequence, and sends the uplink control information based on the uplink CG resource. Alternatively, the terminal device scrambles the uplink control information by using the RNTI, and sends the uplink control information based on the uplink CG resource.

In an implementation of sending the uplink data based on the first configuration information, the first configuration information is used to configure an uplink CG resource and an RNTI. The terminal device generates a sequence by using the RNTI, scrambles the uplink data by using the sequence, and sends the uplink data based on the uplink CG resource. Alternatively, the terminal device scrambles the uplink data by using the RNTI, and sends the uplink data based on the uplink CG resource.

In an implementation of sending the uplink data based on the first configuration information, the first configuration information is used to configure an RNTI, and one or more of a time domain resource periodicity, an open-loop power control—related parameter, a waveform, a redundancy version sequence, a repetition quantity, a frequency hopping mode, a resource allocation type, a HARQ process quantity, a demodulation reference signal—related parameter, an MCS table, or an RBG size. When obtaining the DCI based on the RNTI, the terminal device activates CG-based PUSCH transmission based on the DCI, generates a sequence by using the RNTI, scrambles the uplink data by using the sequence, and sends the uplink data based on one or more of a time domain resource, a frequency domain resource, a DMRS, or an MCS indicated by the DCI. Alternatively, when obtaining the DCI based on the RNTI, the terminal device activates CG-based PUSCH transmission based on the DCI, scrambles the uplink data by using the RNTI, and sends the uplink data based on one or more of a time domain resource, a frequency domain resource, a DMRS, or an MCS indicated by the DCI.

When the first configuration information is valid, the terminal device may perform step 703. The terminal device may determine, in one or a combination of the following manners, whether the first configuration information is valid. "Valid" may be understood as "can still be used", and "invalid" may be understood as "can no longer be used".

Manner 1: The first configuration information is invalid when a timer corresponding to the first configuration information expires; otherwise, the first configuration information is valid when the timer corresponding to the first configuration information does not expire. The network device may notify the terminal device of configuration information of the timer corresponding to the first configuration information. For example, in addition to being used to configure the correspondence between the cell identifier and the first configuration information, the second configuration information received by the terminal device is further used to configure the timer corresponding to the first configuration information. For another example, the terminal device may separately receive the configuration information of the timer corresponding to the first configuration information and the second configuration information. The configuration information of the timer is used to configure the timer corresponding to the first configuration information. The timer corresponding to the first configuration information may also be predefined. For example, the timer corresponding to the first configuration information is defined in a protocol.

The timer corresponding to the first configuration information may be implemented in a plurality of different manners.

For example, the timer corresponding to the first configuration information may be represented as start time to end time, for example, 2020/1/18 14:20:20-2020/1/18 14:30:20. In this case, the terminal device may match current system time with the start time to the end time. If the current system time is within the range of the start time to the end time, the terminal device determines that the first configuration information is valid; otherwise, the terminal device determines that the first configuration information is invalid.

For another example, the timer corresponding to the first configuration information may be represented as a time range, for example, 20 min. In this case, the terminal device may calculate a difference between current system time and start time of entering RRC inactive mode. If the difference is within 20 min, the terminal device determines that the first configuration information is valid; otherwise, the terminal device determines that the first configuration information is invalid.

The timer corresponding to the first configuration information may be a timer corresponding to all configuration information included in the first configuration information, or may be a timer corresponding to some configuration information included in the first configuration information. For example, the timer corresponding to the first configuration information may be a timer corresponding to the time-frequency resource that is for the DCI and that is configured in the first configuration information. In other words, the timer acts on the time-frequency resource for the DCI. When the timers corresponding to the some configuration information included in the first configuration information are invalid, it may be considered that the first configuration information is invalid. For example, when the time-frequency resource for the DCI is invalid, it may be considered that the first configuration information is invalid.

Manner 2: The first configuration information is invalid when the terminal device is in RRC connected mode. It may also be understood that the first configuration information is valid when the terminal device is in RRC inactive mode. When receiving a paging message from the network device, the terminal device may switch from RRC inactive mode to RRC connected mode. In this case, the first configuration information is invalid. The network device may be the first network device, or may be any network device in the RNA. Alternatively, when the terminal device needs to send uplink data or uplink information, the terminal device may switch from RRC inactive mode to RRC connected mode. In this case, the first configuration information is invalid.

When the terminal device is in RRC connected mode, the terminal device may release the first configuration information, that is, release the first configuration information corresponding to the cell identifier. If the terminal device moves when the terminal device is in RRC connected mode, a cell handover process may be triggered.

Manner 3: The first configuration information is invalid when the terminal device fails to transmit data by using the RNTI. The RNTI may be, for example, an RNTI configured by using the first configuration information. That the terminal device transmits data by using the RNTI may be: The terminal device generates a sequence by using the RNTI, scrambles uplink data by using the sequence, and sends the uplink data; or the terminal device scrambles uplink data by using the RNTI, and sends the uplink data. For example, the terminal device scrambles uplink data by using the RNTI, and sends the uplink data. However, after sending the uplink data, if the terminal device does not receive a feedback indicating that the network devices successfully receives the uplink data, the terminal device determines that the RNTI is invalid, and further determines that the first configuration information is invalid. In this case, if the terminal device needs to send the uplink data, the terminal device needs to initiate a random access procedure again by using a random access channel (RACH).

The foregoing three manners are used as examples, and do not constitute a limitation on this embodiment of this application.

The terminal device in RRC inactive mode may perform step 701 to step 703, so that the terminal device in RRC inactive mode can obtain the RNTI, and transmit data in RRC inactive mode. It may be understood that an application scenario of the embodiment shown in FIG. 7 is not limited to the terminal device in RRC inactive mode. For example, in a cell handover scenario, the terminal device is handed over from one cell to another cell and keeps in RRC connected mode. In this scenario, the embodiment shown in FIG. 7 may also be used to ensure data transmission.

In the embodiment shown in FIG. 7, when obtaining the cell identifier, the terminal device obtains, based on the cell identifier, the first configuration information used to configure the RNTI, so that the terminal device can obtain an RNTI used by the terminal device in RRC inactive mode, and the terminal device in RRC inactive mode can receive the downlink data and/or transmit the uplink data.

Figure 8:
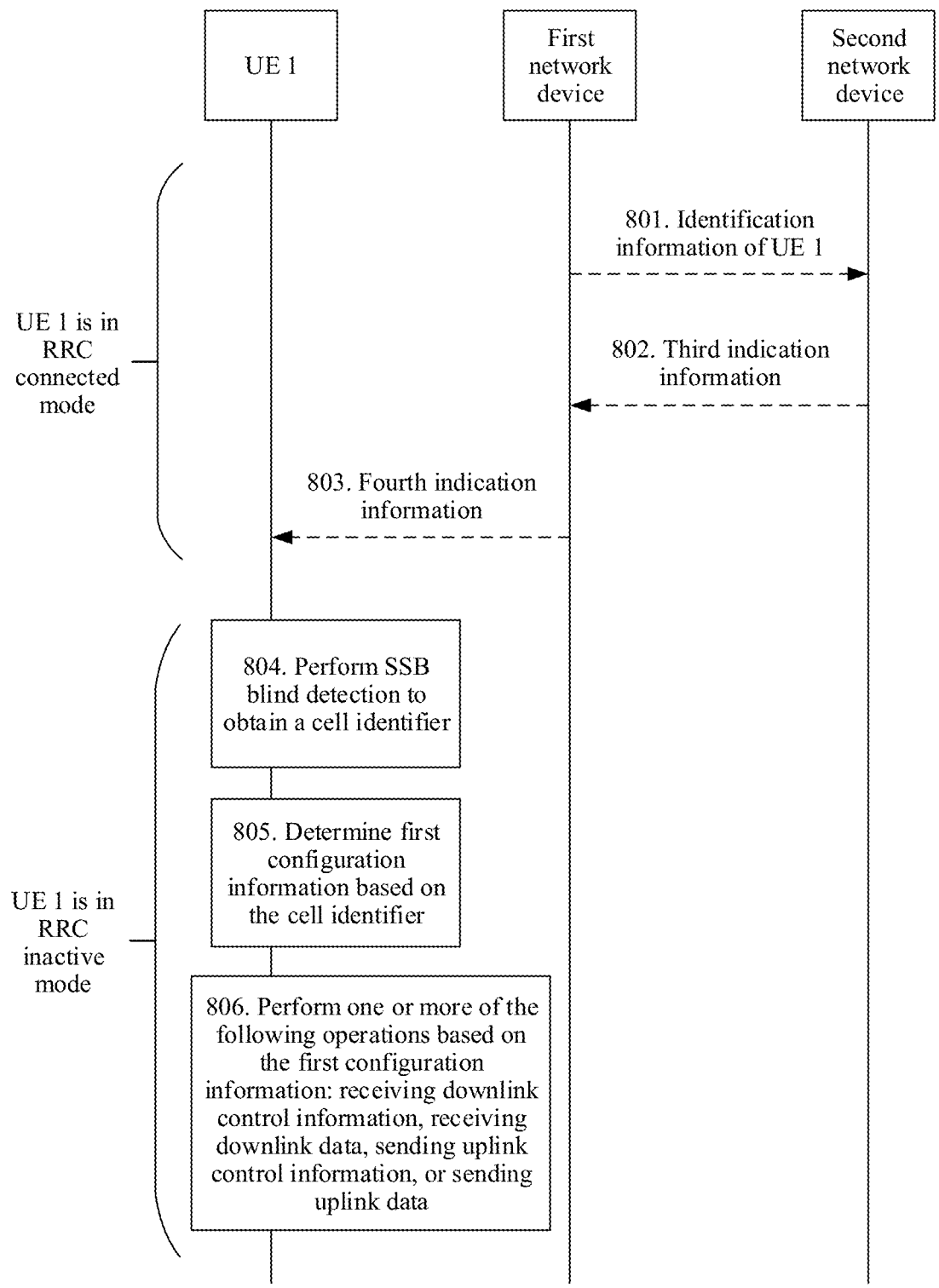
FIG. 8 is a schematic flowchart of another configuration information obtaining method according to an embodiment of this application.

FIG. 8 is a schematic flowchart of another configuration information obtaining method according to an embodiment of this application. The procedure is described from a perspective of interaction, and may include but is not limited to the following steps.

Step 804: UE 1 performs SSB detection to obtain a cell identifier.

When UE 1 is in RRC inactive mode, UE 1 may perform SSB monitoring for downlink synchronization. When detecting an SSB, UE 1 obtains, based on the SSB, a cell identifier corresponding to the SSB, that is, obtains a cell identifier of a cell on which UE 1 camps. Optionally, UE 1 obtains an index of the SSB based on the SSB. For details about how UE 1 obtains the cell identifier and the index of the SSB based on the SSB, refer to the specific descriptions of step 701 in the embodiment shown in FIG. 7. Details are not described herein again.

The SSB may be an SSB from a first network device, or may be an SSB from a second network device.

Step 805: UE 1 determines first configuration information based on the cell identifier.

UE 1 determines the first configuration information based on the cell identifier and fourth configuration information. The fourth configuration information is from the first network device. For details, refer to specific descriptions of step 803.

In an implementation, UE 1 determines, based on the cell identifier and a correspondence that is between a cell identifier of a second cell and third configuration information (used to configure an RNTI) and that is configured by using the fourth configuration information, an RNTI corresponding to the cell identifier, and uses the RNTI as content configured by using the first configuration information. For example, UE 1 searches, based on the cell identifier, a table corresponding to the third configuration information for the RNTI corresponding to the cell identifier, and uses the RNTI as the content configured by using the first configuration information.

In an implementation, UE 1 determines, based on the cell identifier and a correspondence that is between a cell identifier of a second cell and third configuration information (used to configure an RNTI and a time-frequency resource for DCI) and that is configured by using the fourth configuration information, an RNTI and a time-frequency resource for DCI that correspond to the cell identifier, and uses the RNTI and the time-frequency resource for the DCI as content configured by using the first configuration information. For example, UE 1 searches, based on the cell identifier, a table corresponding to the third configuration information for the RNTI and the time-frequency resource for the DCI that correspond to the cell identifier, and uses the RNTI and the time-frequency resource for the DCI as the content configured by using the first configuration information. If the time-frequency resource for the DCI in the first configuration information includes a plurality of sets of time-frequency resources, UE 1 may use a set of time-frequency resources that are used last time, or randomly select a set of time-frequency resources for use.

In an implementation, UE 1 determines the first configuration information based on the cell identifier and a correspondence that is between a cell identifier of a second cell and third configuration information (used to configure an RNTI and a time-frequency resource for DCI, and an SSB index corresponding to the time-frequency resource for the DCI) and that is configured by using the fourth configuration information. For example, UE 1 searches, based on the cell identifier, a table corresponding to the third configuration information for the RNTI and the time-frequency resource for the DCI that correspond to the cell identifier. If the time-frequency resource for the DCI includes a plurality of sets of time-frequency resources, UE 1 may search, based on the index of the detected SSB, the plurality of sets of time-frequency resources for a time-frequency resource corresponding to the index, and use the RNTI and the time-frequency resource as content configured by using the first configuration information. Subsequently, UE 1 switches to RRC inactive mode again. When detecting the SSB, UE 1 may directly use the RNTI and the time-frequency resource.

In the foregoing several implementations, the third configuration information is sent by the second network device to the first network device. For details, refer to the descriptions of step 802.

Step 806: UE 1 performs one or more of the following operations based on the first configuration information:

receiving the downlink control information, receiving downlink data, sending uplink control information, or sending uplink data.

For step 806, refer to the specific descriptions of step 703 in the embodiment shown in FIG. 7. Details are not described herein again.

Step 804 to step 806 may be performed when UE 1 is in RRC inactive mode.

In an implementation, for UE 1 in RRC inactive mode, the second network device may determine, in one or more of the following manners, whether the third configuration information is valid.

Manner 1: The third configuration information is invalid when a timer corresponding to the third configuration information expires; otherwise, the third configuration information is valid when the timer corresponding to the third configuration information does not expire. For the timer corresponding to the third configuration information, refer to the descriptions of the timer corresponding to the first configuration information in the embodiment shown in FIG. 7. Details are not described herein again.

Manner 2: The third configuration information is invalid when UE 1 is in RRC connected mode. It may be understood that the third configuration information is invalid when UE 1 switches from RRC inactive mode to RRC connected mode. When UE 1 switches from RRC inactive mode to RRC connected mode, a connected network device may send a notification message to the second network device, where the notification message is used to indicate that UE 1 is in RRC connected mode. If a network device connected to UE 1 is one of second network devices, the network device sends a notification message to another second network device, and the another second network device determines that the third configuration information is invalid and releases the third configuration information. If a network device connected to UE 1 is the first network device, the first network device sends a notification message to the second network device, and the second network device determines that the third configuration information is invalid and releases the third configuration information. The second network device may alternatively learn, in another manner, that UE 1 is in RRC connected mode.

Manner 3: The third configuration information is invalid when UE 1 is not in an RNA. It may be understood that the third configuration information is invalid when UE 1 leaves the RNA. If all network devices in the RNA send downlink data to UE 1 and receive no feedback from UE 1, it is considered that UE 1 leaves the RNA. An AMF entity may learn whether the network device in the RNA receives a feedback from UE 1 on the downlink data sent by the network device. When learning that all the network devices in the RNA receive feedbacks on the downlink data sent by the network devices, the AMF entity sends a notification message to the second network device. The notification message is used to indicate that UE 1 has left the RNA. In this case, when receiving the notification message, the second network device may determine that the third configuration information is invalid, and release the third configuration information. The second network device may alternatively learn, in another manner, that UE 1 has left the RNA.

The foregoing three manners are used as examples, and do not constitute a limitation on this embodiment of this application.

In an implementation, for UE 1 in RRC inactive mode, the first network device may determine, in one or more of the following manners, whether the third configuration information is valid.

Manner 1: The third configuration information is invalid when a timer corresponding to the third configuration information expires; otherwise, the third configuration information is valid when the timer corresponding to the third configuration information does not expire.

Manner 2: The third configuration information is invalid when UE 1 is in RRC connected mode. When UE 1 resumes an RRC connection to the first network device, the first network device determines that the third configuration information configured by the second network device is invalid, and releases the third configuration information. If a network device connected to UE 1 when UE 1 switches from RRC inactive mode to RRC connected mode is not the first network device, the first network device may learn from the network device, or learn in another manner that UE 1 is in RRC connected mode. When determining that the third configuration information is invalid, the first network device releases the third configuration information.

Manner 3: The third configuration information is invalid when UE 1 is not in an RNA. Refer to Manner 3 above in which the second network device determines whether the third configuration information is invalid. Details are not described herein again.

Optionally, before step 804, the method further includes step 801 to step 803.

Step 801: The first network device sends identification information of UE 1 to the second network device. Correspondingly, the second network device receives the identification information of UE 1 from the first network device.

Step 801 to step 803 may be performed when UE 1 is in RRC connected mode. UE 1 may be a terminal device in a network.

The first network device is a network device that establishes an RRC connection to UE 1 before UE 1 switches to RRC inactive mode, and the second network device is a network device in the RNA. UE 1 camps on a first cell within a coverage area of the first network device when UE 1 is in RRC connected mode, and a cell within a coverage area of the second network device is referred to as a second cell. There may be one or more second network devices, and there may be one or more second cells. For ease of understanding, one second network device and one second cell are used as an example for description in the embodiment shown in FIG. 8.

The identification information of UE 1 is used to identify UE 1, and may include but is not limited to: an RNTI such as a C-RNTI, a CS-RNTI, an MCS-C-RNTI, or an SP-CSI-RNTI that is used to identify the terminal device, an international mobile subscriber identity (IMSI), an international mobile equipment identity (IMEI), a device identifier, or the like.

The first network device sends the identification information of UE 1 to the second network device. The identification information of UE 1 is used to request the second network device to allocate the third configuration information to UE 1, and is further used to request the second network device to allocate, to the UE, the third configuration information corresponding to the second cell. The second network device may allocate, to different UEs, different third configuration information corresponding to the second cell.

Step 802: The second network device sends the third configuration information to the first network device. Correspondingly, the first network device receives the third configuration information from the second network device.

When the coverage area of the second network device includes one second cell, the second network device allocates the third configuration information to UE 1 based on the identification information of UE 1. The third configuration information is configuration information corresponding to the second cell. When the coverage area of the second network device includes a plurality of second cells, the second network device allocates one piece of third configuration information to UE 1 for each second cell based on the identification information of UE 1. It may be understood that there is a correspondence between a cell identifier of one second cell and one piece of third configuration information.

The third configuration information is used to configure an RNTI, used to configure an RNTI and a time-frequency resource for DCI, used to configure an RNTI, a time-frequency resource for DCI, and SSB index information corresponding to the time-frequency resource for the DCI, or used to configure an RNTI and an uplink CG time-frequency resource.

Optionally, the second network device further sends, to the first network device, the cell identifier that is of the second cell and that corresponds to the third configuration information, so that the first network device learns of the correspondence between the cell identifier of the second cell and the third configuration information.

Optionally, the second network device further sends fifth configuration information to the first network device, where the fifth configuration information is used to configure a correspondence between the third configuration information and the timer. In other words, the second network device further sends, to the first network device, configuration information of the timer corresponding to the third configuration information. The timer is used to determine or maintain validity of the third configuration information.

Step 803: The first network device sends fourth configuration information to UE 1. Correspondingly, UE 1 receives the fourth configuration information from the first network device.

When receiving the third configuration information from the second network device, the first network device sends the fourth configuration information to UE 1. The fourth configuration information is used to configure the correspondence between the cell identifier of the second cell and the third configuration information.

In an implementation, the third configuration information is used to configure an RNTI, and the correspondence that is between the cell identifier of the second cell and the third configuration information and that is configured by using the fourth configuration information may be represented in Table 2.1 below.

TABLE 2.1

| Cell identifier of the second cell | RNTI |
|---|---|
| ID-1 | RNTI-1 |
| ID-2 | RNTI-2 |
| ... | ... |
| ID-X | RNTI-X |

In Table 2.1, when the cell identifier of the second cell is ID-1, a corresponding RNTI is RNTI-1; when the cell identifier of the second cell is ID-2, a corresponding RNTI is RNTI-2; or when the cell identifier of the second cell is ID-X, a corresponding RNTI is RNTI-X.

In an implementation, the third configuration information is used to configure an RNTI and a time-frequency resource for DCI, the time-frequency resource for the DCI may include one or more sets of time-frequency resources, one set of time-frequency resources correspond to configuration information of a CORESET and configuration information of a SearchSpace, and the correspondence that is between the cell identifier of the second cell and the third configuration information and that is configured by using the fourth configuration information may be represented in Table 2.2 below.

TABLE 2.2

| Cell identifier of the second cell | RNTI | Time-frequency resource for the DCI | |
|---|---|---|---|
| | | Configuration information of the CORESET | Configuration information of the SearchSpace |
| ID-1 | RNTI-1 | CORESET-1.1 | SearchSpace-1.1 |
| | | CORESET-1.2 | SearchSpace-1.2 |
| | | CORESET-1.3 | SearchSpace-1.3 |
| ID-2 | RNTI-2 | CORESET-2 | SearchSpace-2 |
| ... | ... | ... | ... |
| ID-X | RNTI-X | CORESET-X | SearchSpace-X |

In Table 2.2, when the cell identifier of the second cell is ID-1, a corresponding RNTI is RNTI-1, and the cell identifier corresponds to three sets of time-frequency resources.

In an implementation, the third configuration information is used to configure an RNTI and a time-frequency resource for DCI, and an SSB index corresponding to the time-frequency resource for the DCI, and the correspondence that is between the cell identifier of the second cell and the third configuration information and that is configured by using the fourth configuration information may be represented in Table 2.3 below.

TABLE 2.3

| Cell identifier of the second cell | RNTI | Time-frequency resource for the DCI | | |
|---|---|---|---|---|
| | | SSB index | Configuration information of the CORESET | Configuration information of the SearchSpace |
| ID-1 | RNTI-1 | SSB-1 | CORESET-1.1 | SearchSpace-1.1 |
| | | SSB-2, SSB-3 | CORESET-1.2 | SearchSpace-1.2 |
| | | All SSBs (all) | CORESET-1.3 | SearchSpace-1.3 |
| ID-2 | RNTI-2 | All SSBs | CORESET-2 | SearchSpace-2 |
| ... | ... | ... | ... | ... |
| ID-X | RNTI-X | SSB-X | CORESET-X | SearchSpace-X |

In Table 2.3, when the cell identifier of the second cell is ID-1, a corresponding RNTI is RNTI-1, and the cell identifier corresponds to three sets of time-frequency resources. Each set of time-frequency resources correspond to one or more SSB indexes. For example, a second set of time-frequency resources correspond to SSB-2 and SSB-3, and a third set of time-frequency resources correspond to all SSBs (all). All SSBs indicate indexes of all SSBs in an SSB periodicity. For example, if the SSB periodicity includes four SSBs, indexes of all the SSBs are SSB-1, SSB-2, SSB-3, and SSB-4. One set of time-frequency resources may correspond to one or more SSB indexes, and one SSB index may correspond to one or more sets of time-frequency resources. For example, in Table 2.3, SSB-1 may correspond to a first set of time-frequency resources of the second cell whose cell identifier is ID-1, or may correspond to a time-frequency resource of the second cell whose cell identifier is ID-2.

In Table 2.3, SSB-X represents an index of one or more SSBs in the SSB periodicity.

In an implementation, the third configuration information is used to configure an RNTI, a time-frequency resource for DCI, and a timer. The timer may be a timer corresponding to the third configuration information, or may be a timer corresponding to the RNTI, or may be a timer corresponding to the time-frequency resource for the DCI. The correspondence that is between the cell identifier of the second cell and the third configuration information and that is configured by using the fourth configuration information may be represented in Table 2.4 below.

TABLE 2.4

| Cell identifier of the second cell | RNTI | Time-frequency resource for the DCI | | |
|---|---|---|---|---|
| | | Configuration information of the CORESET | Configuration information of the SearchSpace | Timer |
| ID-1 | RNTI-1 | CORESET-1.1 | SearchSpace-1.1 | timer-1.1 |
| | | CORESET-1.2 | SearchSpace-1.2 | timer-1.2 |
| | | CORESET-1.3 | SearchSpace-1.3 | timer-1.3 |
| ID-2 | RNTI-2 | CORESET-2 | SearchSpace-2 | timer-2 |
| ... | ... | ... | ... | ... |
| ID-X | RNTI-X | CORESET-X | SearchSpace-X | timer-X |

In Table 2.4, when the cell identifier of the second cell is ID-1, a corresponding RNTI is RNTI-1, and the cell identifier corresponds to three sets of time-frequency resources. Each set of time-frequency resources correspond to one timer. Alternatively, the three sets of time-frequency resources may correspond to a same timer. The timer is used to determine or maintain validity of the third configuration information. For example, if a timer expires, third configuration information corresponding to the timer is invalid.

Table 2.3 and Table 2.4 above may be combined to obtain Table 2.5 below.

TABLE 2.5

| Cell identifier of the second cell | RNTI | Time-frequency resource for the DCI | | | |
|---|---|---|---|---|---|
| | | SSB index | Configuration information of the CORESET | Configuration information of the SearchSpace | Timer |
| ID-1 | RNTI-1 | SSB-1 | CORESET-1.1 | SearchSpace-1.1 | timer-1.1 |
| | | SSB-2, SSB-3 | CORESET-1.2 | SearchSpace-1.2 | timer-1.2 |
| | | All SSBs | CORESET-1.3 | SearchSpace-1.3 | timer-1.3 |
| ID-2 | RNTI-2 | All SSBs | CORESET-2 | SearchSpace-2 | timer-2 |

TABLE 2.5-continued

| Cell identifier of the second cell | RNTI | SSB index | Time-frequency resource for the DCI | | Timer |
|---|---|---|---|---|---|
| | | | Configuration information of the CORESET | Configuration information of the SearchSpace | |
| ... | ... | ... | ... | ... | ... |
| ID-X | RNTI-X | SSB-X | CORESET-X | SearchSpace-X | timer-X |

Table 2.1 to Table 2.5 are used as examples, and do not constitute a limitation on this embodiment of this application. It should be noted that the correspondence between the cell identifier of the second cell and the third configuration information is used as an example in Table 2.1 to Table 2.5. In actual application, a correspondence between a cell identifier of the first cell and configuration information may be further configured, and a configuration manner is similar to that of the third configuration information.

When receiving the fourth configuration information, UE 1 in RRC connected mode may store the fourth configuration information, so that when UE 1 switches to RRC inactive mode, UE 1 may determine the first configuration information based on the fourth configuration information.

After step 803, the first network device may trigger UE 1 to switch from the RRC connected mode to RRC inactive mode. For example, the first network device sends an RRC release message to UE 1, so that UE 1 switches from RRC connected mode to RRC inactive mode. When UE 1 is in RRC inactive mode, UE 1 may perform step 804 to step 806.

In the embodiment shown in FIG. 8, the first network device obtains the third configuration information that is configured by the second network device for UE 1, and sends the fourth configuration information to UE 1, so that UE 1 in RRC inactive mode obtains the first configuration information based on the obtained cell identifier, and the terminal device in RRC inactive mode can receive downlink data and/or transmit uplink data.

For example, when UE 1 is in RRC connected mode, content configured by using the fourth configuration information is shown in Table 3 below. The first row in Table 3 may be indicated as follows: Configuration information corresponding to a cell whose cell ID is 337 includes that RNTI-1 is ABCD (hexadecimal). A time-frequency resource for DCI includes three sets of time-frequency resources. A first set of time-frequency resources are CORESET-1.1+SearchSpace-1.1, which correspond to an SSB index of SSB-1, and correspond to a timer of 100 seconds. A second set of time-frequency resources are CORESET-1.2+SearchSpace-1.2, which correspond to SSB indexes of SSB-2 and SSB-3, and correspond to a timer of 1000 frames. A third set of time-frequency resources are CORESET-1.3+SearchSpace-1.3, which correspond to an SSB index of SSB-3, and correspond to a timer of 200 frames. In the first set of time-frequency resources, configuration information of CORESET-1.1 includes: a frequency domain resource position (frequencyDomainResources)="111011011110011" and time domain resource duration (duration)=3; and configuration information of SearchSpace-1.1 includes: a monitoring periodicity and an offset (monitoringSlotPeriodicityAndOffset)=S10, 4 (in the unit of a slot), monitoring slot duration (duration)=2 (slots), and a monitoring symbol position (monitoringSymbolsWithinSlot)=0 (that is, monitoring starts from the first symbol in the slot).

TABLE 3

| Cell identifier | RNTI | SSB index | Time-frequency resource for the DCI | | Timer |
|---|---|---|---|---|---|
| | | | Configuration information of the CORESET | Configuration information of the SearchSpace | |
| 337 | RNTI-1 = ABCD | SSB-1 | CORESET-1.1 | SearchSpace-1.1 | 100 seconds |
| | | SSB-2, SSB-3 | CORESET-1.2 | SearchSpace-1.2 | 1000 frames |
| | | SSB-3 | CORESET-1.3 | SearchSpace-1.3 | 200 frames |
| ID-X | RNTI-X | SSB-X | CORESET-X | SearchSpace-X | timer-X |

Figure 9:
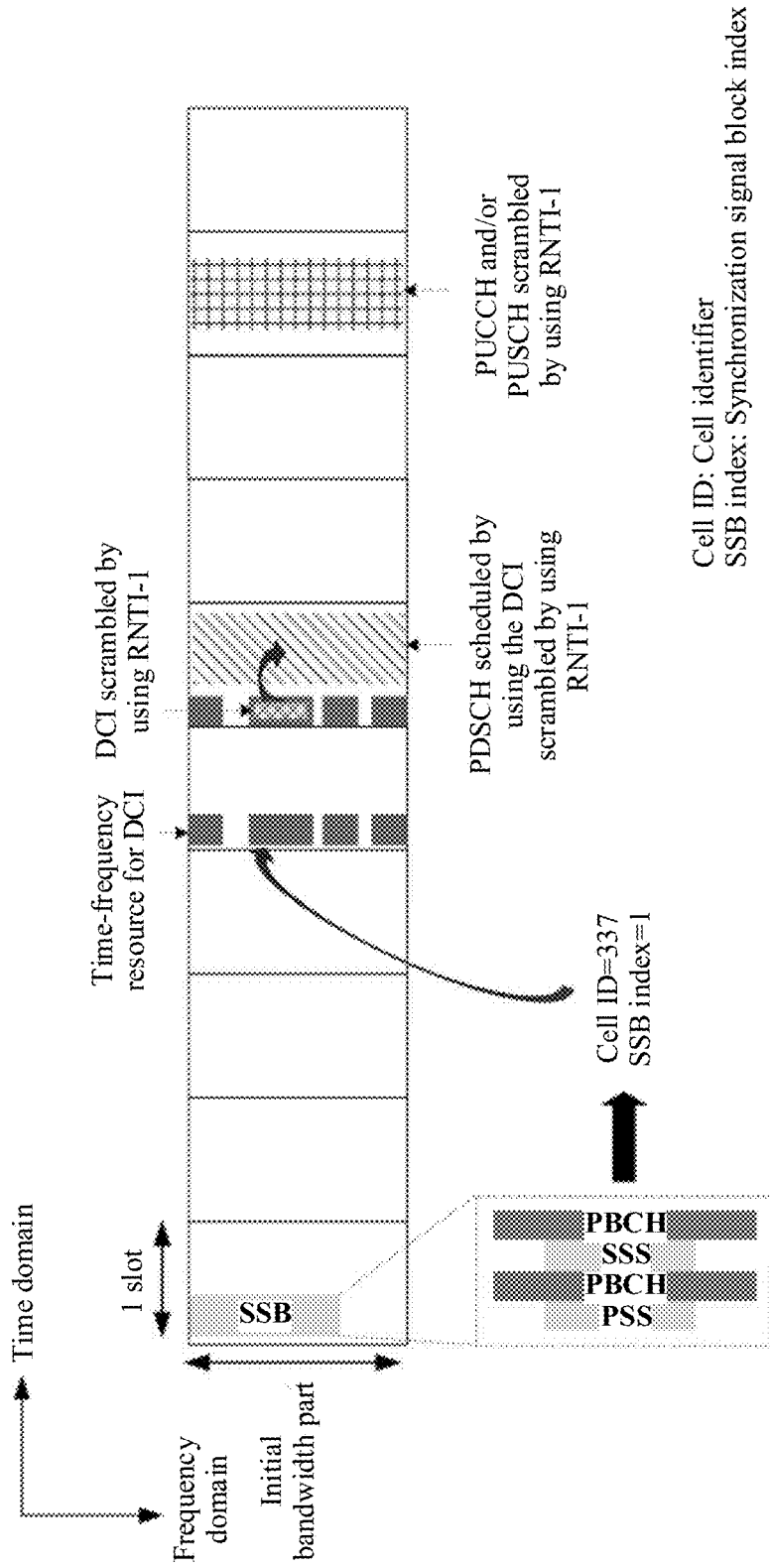
FIG. 9 is an example diagram according to an embodiment of this application.

After switching from RRC connected mode to RRC inactive mode, UE 1 may move in the RNA, and a network side does not know to where UE 1 moves. Therefore, UE 1 periodically performs SSB monitoring to determine a cell to be camped on, and performs downlink synchronization. As shown in FIG. 9, when detecting an SSB, the UE obtains, based on the SSB, a cell ID=337, and an SSB index=1 (namely, SSB-1). The first row of configuration information may be determined from Table 3. To be specific, RNTI-1 is ABCD (hexadecimal), a time-frequency resource for DCI is CORESET-1.1+SearchSpace-1.1, an SSB index is SSB-1, and valid time is 100 seconds (starting from time at which UE 1 enters RRC inactive mode).

UE 1 monitors the DCI in the time-frequency resource for the DCI shown in FIG. 9 by using RNTI-1=ABCD. If the DCI is detected, downlink data may be received based on indication information in the DCI, for example, data on a PDSCH is received and demodulated. UE 1 may alternatively send uplink data based on the indication information in the DCI, for example, send uplink data/a sequence by using one or more of a physical uplink control channel (physical uplink control channel, PUCCH), a PUSCH, or a physical random access channel (physical random access channel, PRACH). UE 1 may alternatively send uplink data/a sequence that is unrelated to the DCI. For example, on a preconfigured time-frequency resource, UE 1 scrambles the uplink data by using RNTI-1=ABCD, and sends the uplink data by using a PUSCH.

The embodiment shown in FIG. 8 is based on the network architecture shown in FIG. 5. If the embodiment is based on the network architecture shown in FIG. 6, step 801 to step 803 may be simplified as follows: The network device allocates the third configuration information to UE 1 for each cell, and sends the fourth configuration information to UE 1. The fourth configuration information is used to configure a correspondence between a cell identifier of each cell within a coverage area of the network device and the third configuration information. When obtaining the cell identifier, UE 1 in RRC inactive mode may obtain the first configuration information based on the cell identifier and the fourth configuration information, to implement data transmission between the terminal device in RRC inactive mode and the network device.

Corresponding to the method provided in the foregoing method embodiments, an embodiment of this application further provides a corresponding apparatus. The apparatus includes a corresponding module configured to perform the foregoing embodiments. The module may be software, hardware, or a combination of software and hardware.

Figure 10:
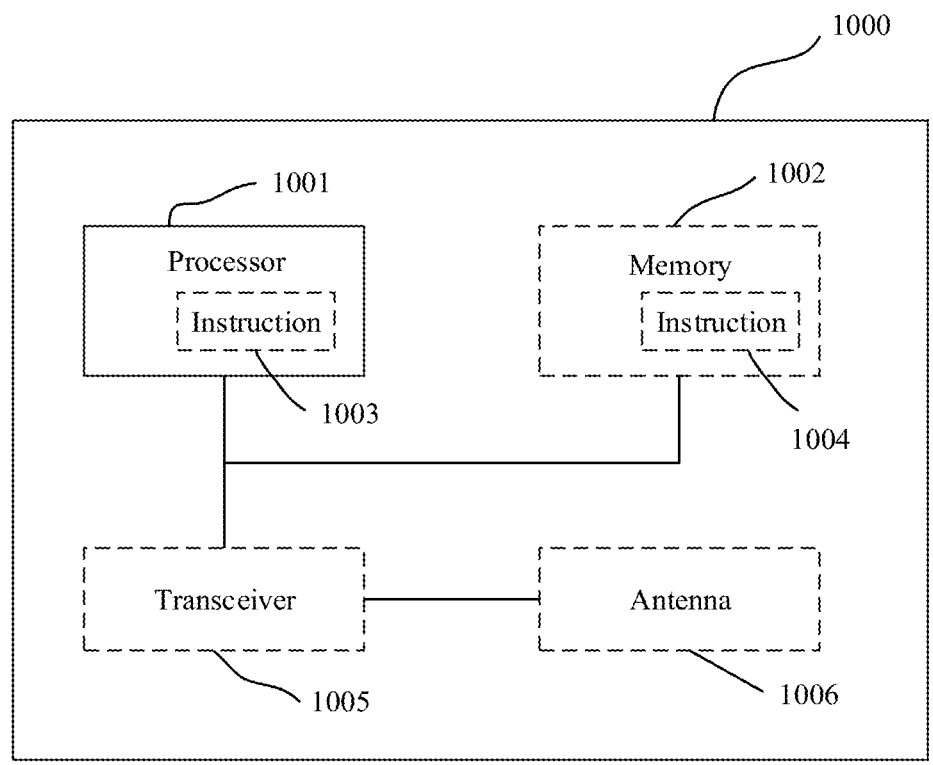
FIG. 10 is a schematic structural diagram of a communication apparatus according to an embodiment of this application.

FIG. 10 is a schematic structural diagram of a communication apparatus. The communication apparatus 1000 may be a network device (a first network device or a second network device), may be a terminal device, may be a chip, a chip system, a processor, or the like that supports a network device in implementing the foregoing methods, or may be a chip, a chip system, a processor, or the like that supports a terminal device in implementing the foregoing methods. The apparatus may be configured to implement the methods described in the foregoing method embodiments. For details, refer to the descriptions in the foregoing method embodiments.

The communication apparatus 1000 may include one or more processors 1001. The processor 1001 may also be referred to as a processing unit, a processing module, or the like, and may implement a control function. The processor 1001 may be a general-purpose processor, a dedicated processor, or the like. For example, the processor 1001 may be a baseband processor or a central processing unit. The baseband processor may be configured to process a communication protocol and communication data. The central processing unit may be configured to control the communication apparatus (for example, a base station, a baseband chip, a terminal, a terminal chip, a distributed unit (distributed unit, DU), or a centralized unit (centralized unit, CU)), execute a software program, and process data of the software program.

In an optional design, the processor 1001 may alternatively store instructions and/or data 1003, and the instructions and/or data 1003 may be run by the processor 1001, to enable the apparatus 1000 to perform the method described in the foregoing method embodiments.

In another optional design, the processor 1001 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

Optionally, the communication apparatus 1000 may include one or more memories 1002 that may store instructions 1004. The instructions 1004 may be run on the processor 1001, to enable the communication apparatus 1000 to perform the methods described in the foregoing method embodiments. Optionally, the memory 1002 may further store data. Optionally, the processor 1001 may also store instructions and/or data. The processor 1001 and the memory 1002 may be separately disposed, or may be integrated together. For example, the correspondence described in the foregoing method embodiments may be stored in the memory 1002 or stored in the processor 1001.

Optionally, the communication apparatus 1000 may further include a transceiver 1005 and/or an antenna 1006. The transceiver 1005 may be referred to as a transceiver unit, a transceiver, a transceiver circuit, a transceiver apparatus, a transceiver module, or the like, and is configured to implement sending and receiving functions.

Optionally, in this embodiment of this application, when the communication apparatus 1000 is a terminal device, the communication apparatus 1000 may be configured to perform step 701 to step 703 in FIG. 7, or step 804 to step 806 in FIG. 8; when the communication apparatus 1000 is a first network device, the communication apparatus 1000 may be configured to perform step 801 to step 803 in FIG. 8; when the communication apparatus 1000 is a second network device, the communication apparatus 1000 may be configured to perform step 801 and step 802 in FIG. 8.

The processor and the transceiver that are described in this application may be implemented on an integrated circuit (integrated circuit, IC), an analog IC, a radio frequency integrated circuit RFIC, a hybrid signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

The communication apparatus in the foregoing embodiment may be a network device or a terminal device. However, a scope of the apparatus described in this application is not limited thereto, and a structure of the communication apparatus may not be limited by FIG. 10. The communication apparatus may be an independent device or may be a part of a large device. For example, the communication apparatus may be:

(1) an independent integrated circuit IC, a chip, or a chip system or subsystem;
(2) a set of one or more ICs, where optionally, the IC set may further include a storage component configured to store data and/or instructions;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or
(6) others.

Figure 11:
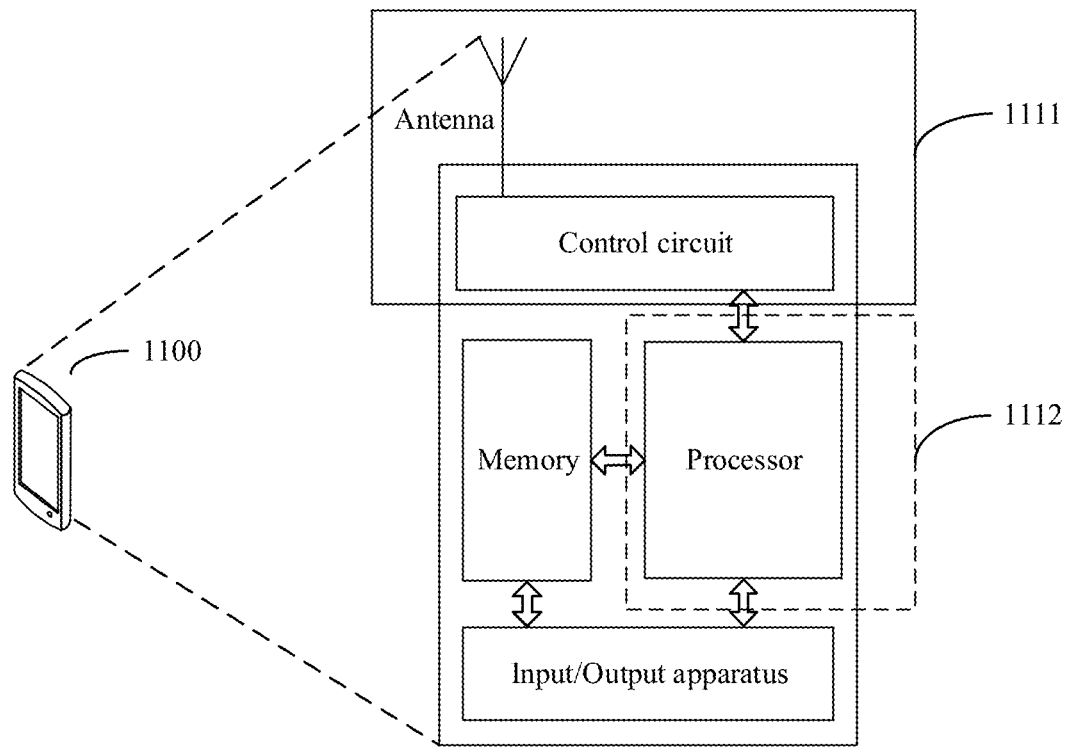
FIG. 11 is a schematic structural diagram of a terminal device according to an embodiment of this application.

FIG. 11 is a schematic structural diagram of a terminal device. The terminal device is applicable to the network architecture shown in FIG. 5 or FIG. 6. For ease of description, FIG. 11 shows only main components of the terminal device. As shown in FIG. 11, the terminal device 1100 includes a processor, a memory, a control circuit, an antenna, and an input/output apparatus. The processor is mainly configured to: process a communication protocol and communication data, control the entire terminal, execute a software program, and process data of the software program. The memory is configured to store the software program and the data. The radio frequency circuit is mainly configured to perform conversion between a baseband signal and a radio frequency signal and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user, and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal in a form of an electromagnetic wave through the antenna. When data is sent to the terminal device, the radio frequency circuit receives a radio frequency signal through the antenna, further converts the radio frequency signal into a baseband signal, and outputs the baseband signal to the processor. The processor converts the baseband signal into data, and processes the data.

For ease of description, FIG. 11 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 11 is integrated with functions of the baseband processor and the central processing unit. A person skilled in the art may understand that, the baseband processor and the central processing unit may be independent processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have a transceiver function may be considered as a transceiver module 1111 of the terminal device 1100, and the processor having a processing function may be considered as a processing module 1112 of the terminal device 1100. As shown in FIG. 11, the terminal device 1100 includes the transceiver module 1111 and the processing module 1112. The transceiver module may also be referred to as a transceiver, a transceiver apparatus, a transceiver unit, or the like. Optionally, a component for implementing the receiving function in the transceiver module 1111 may be considered as a receiving module, and a component for implementing the sending function in the transceiver module 1111 may be considered as a sending module. That is, the transceiver module 1111 includes the receiving module and the sending module. For example, the receiving module may also be referred to as a receiver, a receiver, a receiver circuit, a receiving unit, or the like, and the sending module may be referred to as a transmitter, a transmitter, a transmitter circuit, a sending unit, or the like. Optionally, the receiving module and the sending module may be one integrated module, or may be a plurality of independent modules. The receiving module and the sending module may be located at one geographical location, or may be scattered at a plurality of geographical locations.

Figure 12:
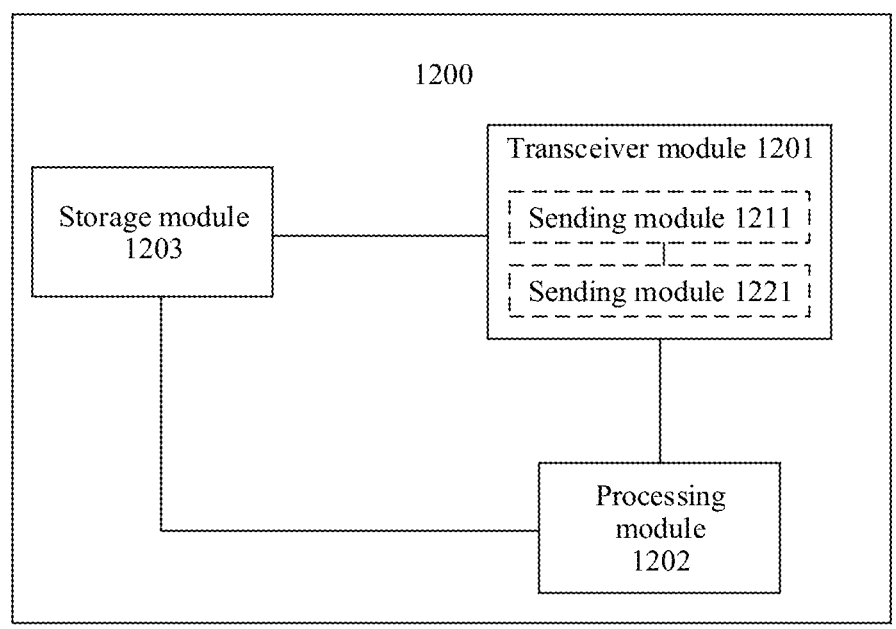
FIG. 12 is another schematic structural diagram of a communication apparatus according to an embodiment of this application.

As shown in FIG. 12, another embodiment of this application provides a communication apparatus 1200. The apparatus may be a terminal device, or may be a component (for example, an integrated circuit or a chip) of the terminal device. Alternatively, the apparatus may be a network device (a first network device or a second network device), or may be a component (for example, an integrated circuit or a chip) of the network device. Alternatively, the apparatus may be another communication module configured to implement the methods in the method embodiments of this application. The communication apparatus 1200 may include a processing module 1202 (or referred to as a processing unit). Optionally, the communication apparatus may further include a transceiver module 1201 (or referred to as a transceiver unit) and a storage module 1203 (or referred to as a storage unit).

In a possible design, one or more modules in FIG. 12 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be disposed separately, or may be integrated.

The communication apparatus 1200 has a function of implementing the terminal device described in embodiments of this application. For example, the communication apparatus 1200 includes a corresponding module, unit, or means used by the terminal device to perform the steps related to the terminal device and described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments. Alternatively, the communication apparatus 1200 has a function of implementing the network device described in embodiments of this application. For example, the communication apparatus 1200 includes a corresponding module, unit, or means used by a first network device to perform the steps related to the first network device and described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiments.

Optionally, the modules in the communication apparatus 1200 in this embodiment of this application may be configured to perform the method described in FIG. 7 or FIG. 8 in embodiments of this application, or may be configured to perform a method obtained by combining methods described in the foregoing two or more figures.

In a possible design, the communication apparatus 1200 is a terminal device, and may include a processing module 1202 and a transceiver module 1201.

The processing module 1202 is configured to: obtain a cell identifier, and obtain first configuration information based on the cell identifier, where there is a correspondence between the cell identifier and the first configuration information, and the first configuration information is used to configure a radio network temporary identifier.

The processing module 1202 is further configured to control, based on the first configuration information, the transceiver module 1201 to perform one or more of the following operations:

receiving downlink control information, receiving downlink data, sending uplink control information, or sending uplink data.

Optionally, the transceiver module 1202 is further configured to receive second configuration information, where the second configuration information is used to configure the correspondence between the cell identifier and the first configuration information.

Optionally, that there is a correspondence between the cell identifier and the first configuration information is specifically: there is a correspondence between the cell identifier and the radio network temporary identifier; and the processing module 1202 is specifically configured to obtain the radio network temporary identifier based on the cell identifier.

Optionally, the first configuration information is further used to configure a time-frequency resource for the downlink control information.

Optionally, that there is a correspondence between the cell identifier and the first configuration information is specifically: there is a correspondence between the cell identifier and a radio network temporary identifier and the time-frequency resource for the downlink control information; and the processing module 1202 is specifically configured to obtain the radio network temporary identifier and the time-frequency resource for the downlink control information based on the cell identifier.

Optionally, that there is a correspondence between the cell identifier and the first configuration information is specifically: there is a correspondence between the cell identifier and a radio network temporary identifier and the time-frequency resource for the downlink control information. The processing module 1202 is further configured to obtain a synchronization signal block index, where there is a correspondence between the synchronization signal block index and the time-frequency resource for the downlink control information. The processing module 1202 is specifically configured to: obtain the radio network temporary identifier based on the cell identifier, and obtain the time-frequency resource for the downlink control information based on the cell identifier and the synchronization signal block index.

Optionally, the first configuration information is invalid when a timer corresponding to the first configuration information expires.

Optionally, the first configuration information is invalid when a terminal device is in radio resource control connected mode.

Optionally, the first configuration information is invalid when data fails to be transmitted by using the radio network temporary identifier.

Optionally, the terminal device is in radio resource control inactive mode.

In a possible design, the communication apparatus 1200 is a first network device and may include a transceiver module 1201. The transceiver module 1201 may include a sending module 1211 and a receiving module 1221.

The sending module 1211 is configured to send identification information of a terminal device, where the identification information of the terminal device is used to request third configuration information corresponding to the terminal device, and the third configuration information is used to configure a radio network temporary identifier.

The receiving module 1221 is configured to receive the third configuration information, where there is a correspondence between the third configuration information and a cell identifier of a second cell.

Optionally, the sending module 1211 is further configured to send fourth configuration information to the terminal device, where the fourth configuration information is used to configure the correspondence between cell identifier of the second cell and the third configuration information.

Optionally, that there is a correspondence between the third configuration information and a cell identifier of a second cell is specifically: there is a correspondence between the radio network temporary identifier and the cell identifier of the second cell.

Optionally, the third configuration information is further used to configure a time-frequency resource for downlink control information.

Optionally, that there is a correspondence between the third configuration information and a cell identifier of a second cell is specifically: there is a correspondence between a radio network temporary identifier and the time-frequency resource for the downlink control information and the cell identifier of the second cell.

Optionally, there is also a correspondence between the time-frequency resource for the downlink control information and a synchronization signal block index.

Optionally, the receiving module 1221 is further configured to receive fifth configuration information, where the fifth configuration information is used to configure a timer corresponding to the third configuration information.

In a possible design, the communication apparatus 1200 is a first network device and may include a transceiver module 1201. The transceiver module 1201 may include a sending module 1211 and a receiving module 1221.

The receiving module 1221 is configured to receive identification information of a terminal device.

The sending module 1211 is configured to send third configuration information based on the identification information of the terminal device, where the third configuration information is used to configure a radio network temporary identifier, and there is a correspondence between the third configuration information and a cell identifier of a second cell.

Optionally, that there is a correspondence between the third configuration information and a cell identifier of a second cell is specifically: there is a correspondence between the radio network temporary identifier and the cell identifier of the second cell.

Optionally, the third configuration information is further used to configure a time-frequency resource for downlink control information.

Optionally, that there is a correspondence between the third configuration information and a cell identifier of a second cell is specifically: there is a correspondence between a radio network temporary identifier and the time-frequency resource for the downlink control information and the cell identifier of the second cell.

Optionally, there is also a correspondence between the time-frequency resource for the downlink control information and a synchronization signal block index.

Optionally, the sending module is further configured to send fifth configuration information, where the fifth configuration information is used to configure a timer corresponding to the third configuration information.

Optionally, the third configuration information is invalid when the timer corresponding to the third configuration information expires.

Optionally, the third configuration information is invalid when the terminal device is in radio resource control connected mode.

Optionally, the third configuration information is invalid when the terminal device is not in a notification area.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in embodiments of this application may also correspondingly implement these features or functions. Details are not described herein.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the functions for corresponding application, but it should not be considered that the implementation goes beyond the scope of embodiments of this application.

It may be understood that, the processor in embodiments of this application may be an integrated circuit chip, and has a signal processing capability. In an implementation process, steps in the foregoing method embodiments can be completed by using a hardware integrated logical circuit in the processor or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The solutions described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that, in embodiments of this application, the memory may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external buffer. By way of example and not limitation, many forms of RAMs may be used, for example, a static random access memory (static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described in this specification is intended to include but is not limited to these memories and any memory of another appropriate type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of foregoing embodiments may be implemented by using software, hardware, firmware, or any combination thereof. When software is used to implement embodiments, embodiments may be all or partially implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any proper manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

It may be understood that, in embodiments of this application, "B corresponding to A" indicates that B is associated with A, and B may be determined based on A. However, it should be further understood that determining B based on A does not mean that B is determined based only on A, that is, B may alternatively be determined based on A and/or other information.

The correspondences shown in the tables in this application may be configured, or may be predefined. Values of the information in the tables are merely examples, and other values may be configured. This is not limited in this application. When a correspondence between configuration information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

A person of ordinary skill in the art may understand that, for a purpose of convenient and brief descriptions, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or other forms.

The units described as separate components may or may not be physically separate, and components displayed as units may or may not be physical units. To be specific, the components may be located at one position, or may be distributed on a plurality of network units. Some or all of the units may be selected depending on actual requirements to achieve the objectives of the solutions in embodiments.

In addition, function units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing implementations of this application do not constitute a limitation on the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication method, comprising:
obtaining a cell identifier;
obtaining first configuration information based on the cell identifier, wherein there is a correspondence between the cell identifier and the first configuration information, the cell identifier is an identifier of a cell in a radio access network-based notification area (RNA), the first configuration information configures a time-frequency resource for downlink control information (DCI), the cell identifier is associated with a radio network temporary identifier and the time-frequency resource for the DCI, and the obtaining first configuration information based on the cell identifier comprises obtaining the radio network temporary identifier and the time frequency resource for the DCI based on the cell identifier; and
performing one or more of the following operations based on the first configuration information: receiving DCI, receiving downlink data, sending uplink control information, or sending uplink data.

2. The method according to claim 1, wherein the method further comprises:
receiving second configuration information, wherein the second configuration information configures the correspondence between the cell identifier and the first configuration information.

3. The method according to claim 1, wherein the first configuration information configures the radio network temporary identifier.

4. The method according to claim 3, wherein:
there is a correspondence between the cell identifier and the radio network temporary identifier.

5. The method according to claim 1, wherein the method further comprises:
obtaining a synchronization signal block index, wherein there is a correspondence between the synchronization signal block index and the time-frequency resource for the DCI; and
the obtaining the time-frequency resource for the DCI is further based on the synchronization signal block index.

6. An apparatus, comprising:
one or more processors; and
a memory having instructions stored thereon that, when executed by the one or more processors, cause the apparatus to:
obtain a cell identifier;
obtain first configuration information based on the cell identifier, wherein there is a correspondence between the cell identifier and the first configuration information, the cell identifier is an identifier of a cell in a radio access network-based notification area (RNA), the first configuration information configures a time-frequency resource for downlink control information (DCI), the cell identifier is associated with a radio network temporary identifier and the time-frequency resource for the DCI, and the obtaining first configuration information based on the cell identifier comprises obtaining the radio network temporary identifier and the time frequency resource for the DCI based on the cell identifier; and
perform one or more of the following operations based on the first configuration information: receive DCI, receive downlink data, send uplink control information, or send uplink data.

7. The apparatus according to claim 6, wherein the apparatus is further caused to:
receive second configuration information, wherein the second configuration information configures the correspondence between the cell identifier and the first configuration information.

8. The apparatus according to claim 6, wherein the first configuration information configures the radio network temporary identifier.

9. The apparatus according to claim 8, wherein there is a correspondence between the cell identifier and the radio network temporary identifier.

10. The apparatus according to claim 6, wherein the apparatus is further caused to:
obtain a synchronization signal block index, wherein there is a correspondence between the synchronization signal block index and the time-frequency resource for the DCI; and
the obtaining the time-frequency resource for the DCI is further based on the synchronization signal block index.

11. A non-transitory computer readable medium, wherein the non-transitory computer readable medium stores instructions that are executable by a computer, and the instructions comprise instructions for:
obtaining a cell identifier;
obtaining first configuration information based on the cell identifier, wherein there is a correspondence between the cell identifier and the first configuration information, the cell identifier is an identifier of a cell in a radio access network-based notification area (RNA), the first configuration information configures a time-frequency resource for downlink control information (DCI), the cell identifier is associated with a radio network temporary identifier and the time-frequency resource for the DCI, and the obtaining first configuration information based on the cell identifier comprises obtaining the radio network temporary identifier and the time frequency resource for the DCI based on the cell identifier; and performing one or more of the following operations based on the first configuration information: receiving DCI, receiving downlink data, sending uplink control information, or sending uplink data.

12. The non-transitory computer readable medium according to claim 11, wherein the instructions further comprises instructions for:
receiving second configuration information, wherein the second configuration information configures the correspondence between the cell identifier and the first configuration information.

13. The non-transitory computer readable medium according to claim 11, wherein the first configuration information configures the radio network temporary identifier.

14. The non-transitory computer readable medium according to claim 13, wherein there is a correspondence between the cell identifier and the radio network temporary identifier.

15. The non-transitory computer readable medium according to claim 11, wherein the instructions further comprises instructions for:
obtaining a synchronization signal block index, wherein there is a correspondence between the synchronization signal block index and the time-frequency resource for the DCI; and
the obtaining the time-frequency resource for the DCI is further based on the synchronization signal block index.

* * * * *